US010773608B2

(12) United States Patent
Koehler et al.

(10) Patent No.: US 10,773,608 B2
(45) Date of Patent: Sep. 15, 2020

(54) METHOD AND APPARATUS FOR REMOVING, INSTALLING, AND TRANSPORTING AUTOMOTIVE SEATS

(71) Applicant: Jon Koehler, Inc., San Diego, CA (US)

(72) Inventors: Jon F. Koehler, San Diego, CA (US); Charles E. Eggers, San Diego, CA (US)

(73) Assignee: Jon Koehler, Inc., San Diego, CA (US)

( * ) Notice: Subject to any disclaimer, the term of this patent is extended or adjusted under 35 U.S.C. 154(b) by 0 days.

(21) Appl. No.: 16/208,509

(22) Filed: Dec. 3, 2018

(65) Prior Publication Data

US 2019/0100116 A1    Apr. 4, 2019

(51) Int. Cl.
*B60N 2/015* (2006.01)

(52) U.S. Cl.
CPC ..... *B60N 2/01591* (2013.01); *B60N 2/01583* (2013.01)

(58) Field of Classification Search
CPC .......... B60N 2/01591; B60N 2/01583
See application file for complete search history.

(56) References Cited

U.S. PATENT DOCUMENTS

| | | | |
|---|---|---|---|
| 4,874,203 A | 10/1989 | Henley | |
| 4,936,527 A | 6/1990 | Gorges | |
| 5,222,712 A * | 6/1993 | Gregory | A47B 91/00 248/503.1 |
| 5,372,398 A * | 12/1994 | Aneiros | B60N 2/01583 248/430 |
| 5,474,311 A | 12/1995 | Tyciak et al. | |
| 5,547,242 A * | 8/1996 | Dukatz | B60N 2/01583 116/283 |
| 5,678,973 A * | 10/1997 | Cox | B65G 7/04 414/341 |
| 5,711,505 A * | 1/1998 | Nemoto | B60N 2/01516 248/424 |
| 5,911,465 A * | 6/1999 | Yamamoto | B60N 2/01525 296/65.03 |
| 6,010,296 A * | 1/2000 | Enders | B60N 2/01508 414/346 |
| 6,036,252 A | 3/2000 | Hecksel et al. | |
| 6,179,363 B1 * | 1/2001 | Palajac | B60N 2/01583 296/65.03 |
| 7,226,264 B2 * | 6/2007 | Eggleston | B62B 3/002 414/334 |

(Continued)

*Primary Examiner* — Brian L Swenson
(74) *Attorney, Agent, or Firm* — Charles E. Eggers

(57) ABSTRACT

A lightweight, attachable and detachable vehicle seat removal, transport, and reinstallation apparatus is disclosed, including a chassis, casters mounted to the chassis, a seat rear support pin coupled to the chassis for engaging a seat rear attachment of the vehicle seat, and a locking forward pin attached to the chassis for engaging a forward seat attachment of the vehicle seat. A method of vehicle seat removal is disclosed, including positioning one or more seat skates behind a seat such that the seat skates are aligned with vehicle seat attachment means, rotating the vehicle seat upward, rolling the one or more seat skates forward such that the one or more seat skates straddle respective vehicle seat attachment means, rotating the one or more seat skates upward, latching rear seat attachments of the vehicle seat to seat rear support pins of the seat skates, and lowering the vehicle seat for transport.

16 Claims, 18 Drawing Sheets

(56) References Cited

U.S. PATENT DOCUMENTS

| | | | |
|---|---|---|---|
| 7,487,981 B2 * | 2/2009 | Cromie | B65D 19/42 |
| | | | 280/35 |
| 7,798,550 B2 * | 9/2010 | Stefanon | B60N 2/01508 |
| | | | 296/65.03 |
| 9,326,900 B2 * | 5/2016 | Bancroft | B60N 2/01583 |

* cited by examiner

METHOD AND APPARATUS FOR REMOVING, INSTALLING, AND TRANSPORTING AUTOMOTIVE SEATS

TECHNICAL FIELD

The present invention generally relates to automotive seats, and in particular to conveniently attachable and detachable means for removing, moving, and reinstalling automotive seats.

BACKGROUND

Automotive seats have been developed by many vehicle manufacturers to include means for latching, removal, and reinstallation. Able to remove one or more seats, a user may reconfigure the interior of the vehicle to suit various needs for transporting, for example, passengers and various amounts of cargo and/or baggage. Both single and bench seats are usually rather heavy, however, and a widely realized problem with such automotive seats is that once unlatched from the vehicle floor they can be awkward and difficult to lift and transport, requiring significant physical effort on the part of one or more users. Once removed from the vehicle, the seats may further be difficult not only to move about and store, but to eventually return to the vehicle for reinstallation. Some existing solutions are implemented as carriages that attach to the bottoms of the automotive seats or benches and include mechanisms for extending and retracting casters. These carriages tend to be heavy, complicated, and limiting in the case where the user may wish to use the apparatus to remove, move, and reinstall on one or more other vehicles. Indeed, attaching and detaching the carriage from the seat multiple times may be time consuming and requiring of substantial physical effort. Moreover, such complicated designs may lead to elevated manufacturing and acquisition expenses. Other solutions include permanently attached carriages that connect to specially designed features in the vehicle floor and are thus disadvantageously non-portable for use with multiple vehicles.

There is therefore a need for a lightweight, adjustable, affordable, portable, and easily attachable and detachable means enabling a user to conveniently remove single and bench seats from various vehicles, transport a seat from a vehicle to a storage location, transport the seat back to the vehicle, and finally reinstall the seat in the vehicle.

SUMMARY

Accordingly, an automotive seat skate is described herein. The seat skate may be quickly coupled to the bottom of a seat using latches built into the seat frame which are used to secure the seat to a vehicle's floor. Once coupled, the casters on the seat skate allow a user to roll the seat out of the vehicle and on the ground or floor. The seat skate may then be quickly detached from the seat and further used on other vehicles seats, making use of the seat skate efficient and cost effective not only for individual applications but in fleet operations as well. Simple lightweight design also lends itself to decreased manufacturing resources and costs and greater consumer affordability. Further, the seat skate is user-adjustable for convenient reconfiguration for different vehicle applications. Two similar designs are disclosed that apply to seats attaching to a raised vehicle seat base mounted on a vehicle floor, and to those attaching to a seat track inset in the floor.

As will be described in more detail below, in various embodiments the vehicle may be of, but not limited to, a type including vans, minivans, busses, and various trucks where there may be interior space adequate for moving the seat about once it is coupled to the seat skate(s). Embodiments include separate lightweight seat skates in right and left configurations and a single-piece lightweight seat skate incorporating both right and left configurations. It is contemplated that a seat skate in any configuration may be constructed using a variety of materials alone or in combination including, but not limited to, metals, plastics, epoxies, resins, composites, ceramics, polyurethanes, additive materials, and polymers to achieve adequate structural strength and light weight. A seat may be manufactured in many ways including, but not limited to, casting from molds, 3-D printing, component fabrication and assembly by mechanical attachment, welding, and/or fusing.

An aspect includes a vehicle seat removal, transport, and reinstallation apparatus, including a chassis, a multiplicity of casters mounted to the chassis, a seat rear support pin coupled to the chassis for engaging a seat rear attachment of the vehicle seat, and a locking forward pin attached to the chassis for engaging a forward seat attachment of the vehicle seat.

Another aspect includes a load-bearing fulcrum mounted on the chassis, including means for adjustably mounting the fulcrum on the chassis that include a multiplicity of slots into which the load-bearing fulcrum may be inserted, the slots disposed longitudinally on the chassis to provide discrete positions for mounting the load-bearing fulcrum on the chassis.

Another aspect includes means for adjustably attaching the seat rear support pin that include a multiplicity of mounting holes into which the seat rear support pin may be inserted, the mounting holes disposed longitudinally on the chassis and providing discrete positions for mounting the seat rear support pin on the chassis.

Further aspects include a locking pin receiver for receiving and supporting the forward locking pin when it is an extended state.

Other aspects include a raised chassis disposed above the casters for clearance over a seat base, and a lowered chassis disposed at a height above the vehicle floor to allow proximity to a seat track recessed into the vehicle floor.

Other features and advantages will become more readily apparent to those of ordinary skill in the art after reviewing the following detailed description and accompanying drawings.

DETAILED DESCRIPTION

Certain embodiments as disclosed herein provide for seat skate means and apparatus, and methods using the seat skate means and apparatus for removing and replacing a vehicle seat respectively from and to a vehicle.

After reading this description it will become apparent to one skilled in the art how to implement the disclosed means, apparatus, and methods in various alternative embodiments and applications. Although various embodiments are described herein, it will be understood that these embodiments are presented by way of example only, and not by limitation. Accordingly, this detailed description of various embodiments should not be construed to limit the scope or breadth of the present invention as set forth in the appended claims.

Figure 1A:
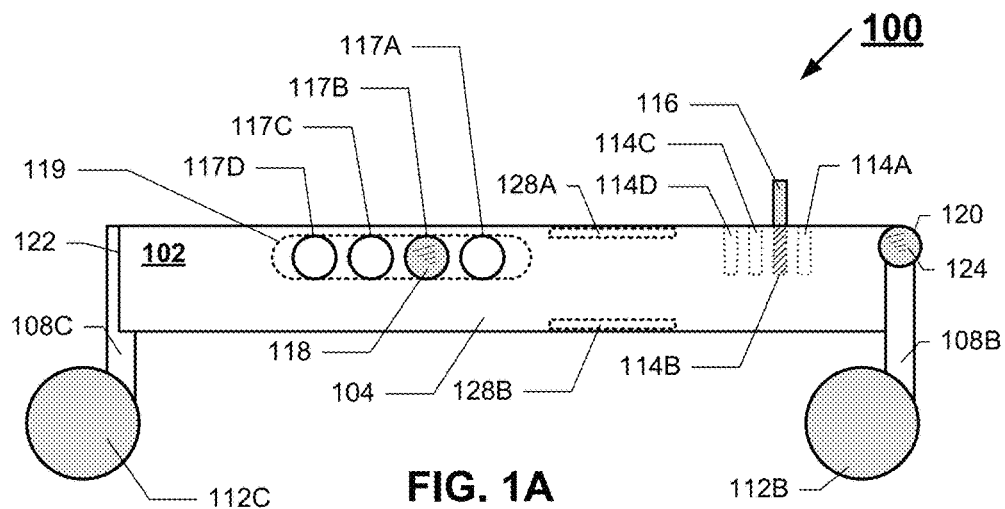
FIGS. 1A-C are respectively right, front, and left side views of an example seat skate including a raised chassis, three casters, a forward locking pin, a seat rear support pin, and an optional load-bearing fulcrum.

FIG. 1A depicts a right side view 100 of an example right seat skate 102. Embodiments provide for the right seat skate 102 to include a multiplicity of casters, as will be shown in FIGS. 1A-C in which an example with three casters 112A-C is depicted. Accordingly, in FIG. 1A a front caster 112B and rear caster 112C are shown, which are attached to a raised chassis 104 by caster support posts 108B, 108C, which in various embodiments allow the casters 112B and 112C to swivel freely. As will be discussed further below, the raised chassis 104 is disposed above the multiplicity of casters 112A-C for clearance over a seat base 316 attached to a vehicle floor 328 as shown in at least FIGS. 3A-3E. That is, the raised chassis 104 is high enough with respect to the height of the seat base 316 which it straddles when in place that components of the right seat skate 102 (and left seat skate 103) clear the top of the seat base 316, as discussed in more detail with regard to FIGS. 3A-3E.

Herein, aspects of the raised chassis 104, and by extension right and left seat skates 102, 103, may be described as having "longitudinal" and "transverse" dispositions. A longitudinal disposition will be understood as being front-to-back, or in the example of FIGS. 1A-C as described below, along an axis defined by the centers of a load-bearing fulcrum 116, a chassis support 128A, 128B, and/or a (rear) caster support post 108C, where "front" will be understood to be at or near the chassis front plates 134A, 134B and the "rear" to be at or near the chassis rear plate 122. Further, the terms "fore" and "aft" may be used to refer to relative longitudinal positions where "fore" corresponds with front and "aft" corresponds with rear.

An optional adjustable load-bearing fulcrum 116 (also referred to herein simply as "fulcrum 116") may be used for leverage exerted upon, and additional support for, a seat 304 (see FIG. 3A, for example) as described in more detail below. In an embodiment, the fulcrum 116 is rigidly mounted on the raised chassis 104 and may provide added structural support to the raised chassis 104. Means may be provided for adjustably mounting the fulcrum 116 on the raised chassis 104. In some embodiments, a multiplicity of fulcrum positioning slots 114A-D may be disposed longitudinally (i.e., front to back) on the raised chassis 104 to provide adjustable, discrete positioning options for various vehicle applications. For example, the fulcrum 116 as depicted is placed in a fulcrum positioning slot 114B but may be placed in any of a multiplicity of fulcrum positioning slots 114A-D depending upon characteristics of the seat 304 and/or circumstances related to coupling the right seat skate 102 to the seat 304. It will be appreciated that more, or fewer, slots such as fulcrum positioning slots 114A-D may be implemented to provide lesser or greater range and/or less or more granularity in longitudinal positioning of the fulcrum 116. Further, fulcrum 116 may be any of multiple versions (not shown) having varying vertical heights, selected for adjustable implementation appropriate to the characteristics of the seat 304 and/or circumstances related to coupling the right seat skate 102 to the seat 304.

An adjustable seat rear support pin 118 coupled to the raised chassis 104 provides a rear coupling point for engaging with the seat 304 at a seat rear attachment 312 and may additionally provide support for the weight of the seat 304. Means may be provided for adjustably mounting the seat rear support pin 118 on the raised chassis 104. In an embodiment, a multiplicity of mounting holes 117A-D into which the seat rear support pin 118 may be inserted may be disposed longitudinally (i.e., front to back) on the raised chassis 104 to provide discrete positioning options. For example, as depicted, the rear support pin 118 is placed in a mounting hole 117B but may be placed in any of mounting holes 117A-D depending upon characteristics of the seat 304 and/or circumstances related to coupling the right seat skate 102 to the seat 304. It is contemplated that more, or fewer, holes such as mounting holes 117A-D may be implemented to provide lesser or greater range and/or less or more granularity in longitudinal positioning of the rear support pin 118. In an embodiment, a slot 119 may be used for continuous positioning of the rear support pin 418 in place of mounting holes 117A-D. To use a slot 119, it is contemplated that the seat rear support pin 118 would further comprise a latching means to secure its position in the right seat skate 102 once it has been located back to front (i.e., left to right, as drawn) in the slot 119. Such a slot 119 provides increased granularity over mounting holes 117A-D for positioning the seat rear support pin 118, and its length can be designed to accommodate a desired positioning range for the seat rear support pin 118.

A locking forward pin 124 provides a forward coupling point for coupling with the seat 304 at a seat forward attachment 308, and additional support for the weight of the seat 304. Locking pin tube 120 acts as a sheath about locking forward pin 124 and may house various retracting/extending means for the locking forward pin 124. As discussed in more detail below, locking forward pin 124 may be in a retracted state as the right seat skate 102 is fitted to the bottom of the seat 304. Once fitted, locking forward pin 124 may be extended to prevent the right seat skate 102 from uncoupling from the front of seat 304 as it is moved, lifted, and/or rolled on casters 112A-C. It will be appreciated that the locking forward pin 124 is substantially the only moving component of the seat skate 104, and therefore advantageously contributes to the overall simplicity in design and manufacture.

Embodiments provide for optional upper and lower chassis supports 128A, 128B, respectively, shown in hidden cross-section view in FIG. 1A, as transverse stiffening elements for the raised chassis 104. It is contemplated that one, both, or neither of chassis supports 128A, 128B may be used according to design and implementation requirements and/or load bearing characteristics of a particular right seat skate 102.

Figure 1B:
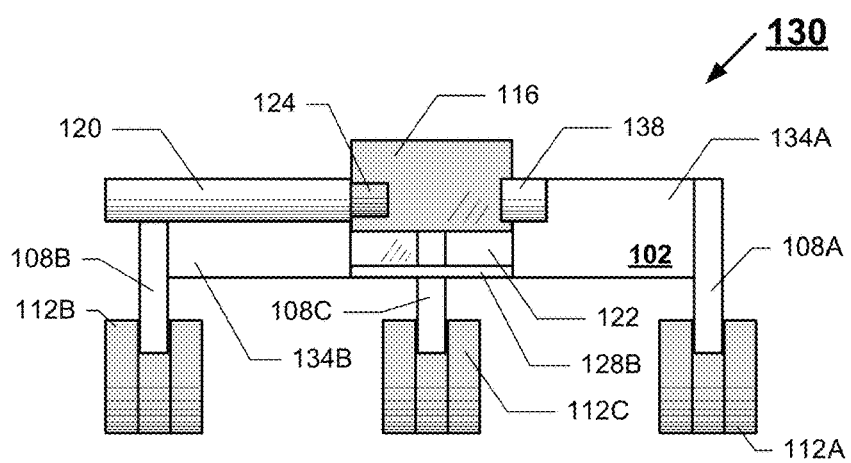

FIG. 1B depicts a front view 130 of the example right seat skate 102 (also referred to herein as a "right" seat skate 102). Extending the foregoing description of the right seat skate 102 related to FIG. 1A, further shown in FIG. 1B are (as viewed from above) front caster 112A attached to the raised chassis 104 with caster support post 108A, which in various embodiments allows the caster 112A to swivel freely. Caster support posts 108A and 108B are shown attached respectively to chassis front plates 134A, 134B. Chassis rear plate 122 is visible in the front view 130, to which the caster support post 108C is attached. In various embodiments the caster support post 108C is centrally disposed in relation to the chassis rear plate 122, as shown, thus centrally disposing the rear caster 112C to the right seat skate 102 overall. It will be appreciated that it is not strictly necessary to dispose the rear caster 112C centrally to the right seat skate 102. It is contemplated that various implementations may militate a design including an off-center location for the rear caster 112C.

In the front view 130, locking forward pin 124 is shown retracted into the locking pin tube 120, which is attached to chassis front plate 134B. Attached to chassis front plate 134A is locking pin receiver 138, which is aligned axially with locking pin tube 120, and which receives and supports the locking forward pin 124 when it is in its extended state. As used herein, "aligned axially" refers to an alignment of central axes of cylinders defined by the locking pin tube 120, locking forward pin 124, and locking pin receiver 138. Thus, in its extended state locking forward pin 124 is rigidly supported at both ends, by locking pin tube 120 and locking pin receiver 138. Lower chassis support 128B is visible in the front view 130, as is the forward-facing surface of fulcrum 116.

Figure 1C:
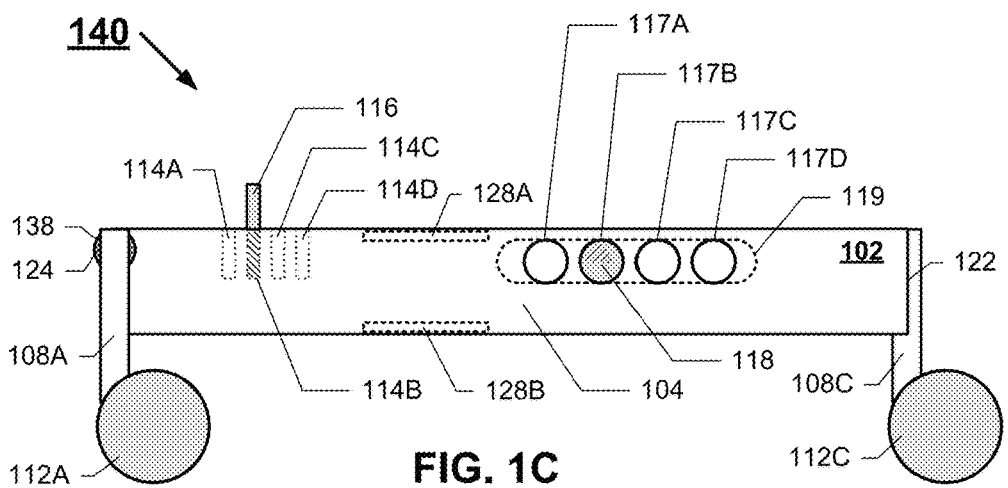

FIG. 1C depicts a left side view 140 of the example right seat skate 102. FIG. 1C depicts elements also shown in FIGS. 1A and 1B, and the reader is directed to the foregoing discussions relating to FIGS. 1A and 1B for elucidation.

Figure 2A:
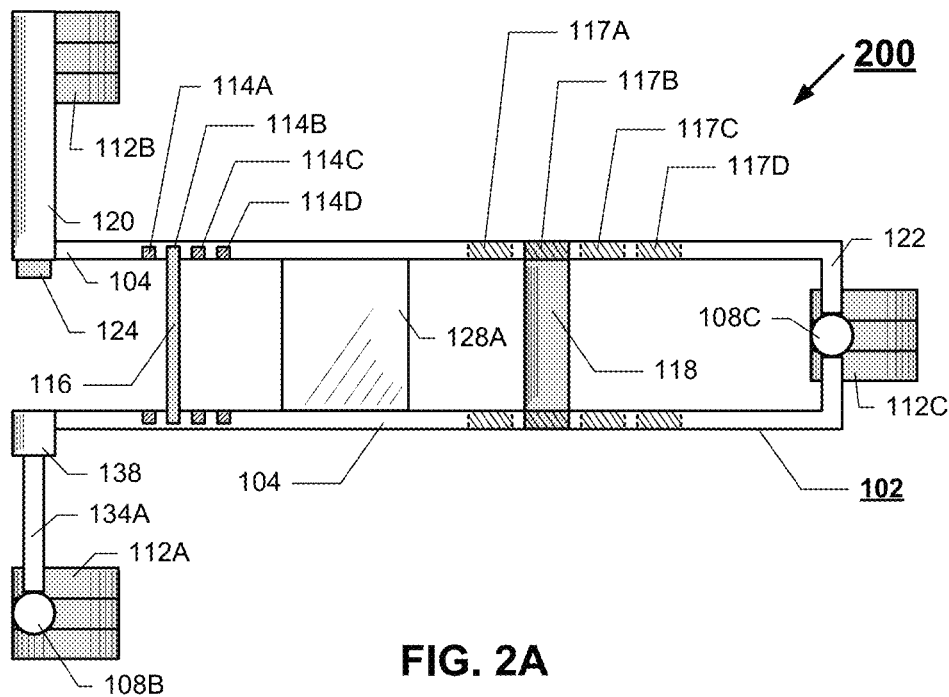
FIGS. 2A and B are top views of the example of FIGS. 1A-C, showing examples of the locking forward pin respectively in retracted (unlocked) and extended (locked) positions.
Figure 2B:
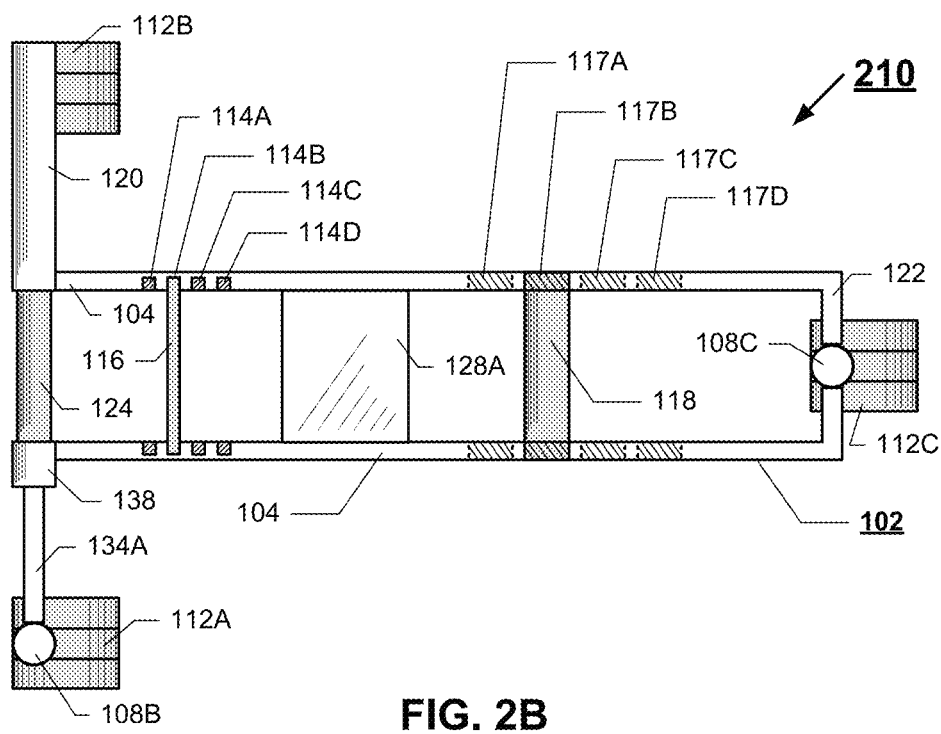
FIGS. 2C and D depict an example of a locking forward pin mechanism.

FIGS. 2A and 2B show top views 200, 210 of right seat skate 102. In FIG. 2A, the locking forward pin 124 is shown in its retracted position, such as when the right seat skate 102 is not coupled to a seat 304. In FIG. 2B, the locking forward pin 124 is shown by contrast in its extended position with the extended end sheathed by the locking forward pin receiver 138, such as when the right seat skate 102 is coupled with seat 304. All of the casters 112A-C are shown, and it is noted here additionally that all or any of them may include a locking mechanism to prevent undesired rolling while coupled or not with the seat 304.

Figure 2C:
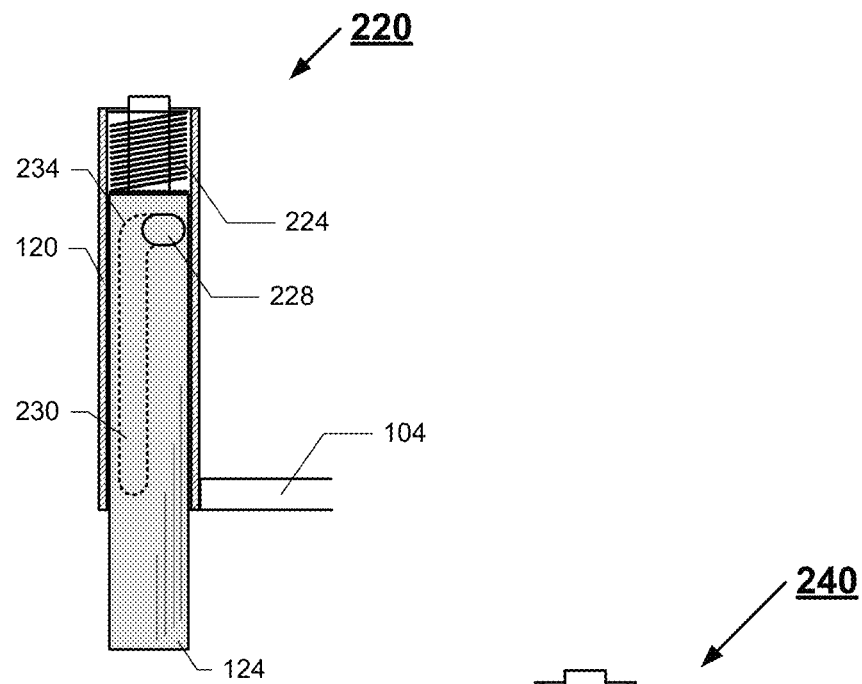
Figure 2D:
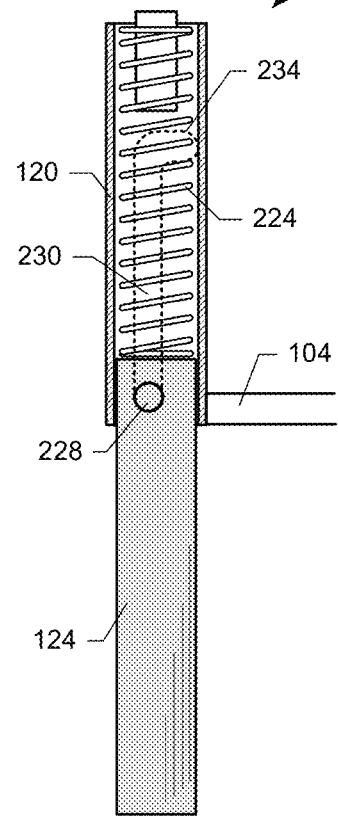

FIGS. 2C and 2D depict an example means for effectuating a locking action of the locking forward pin 124. In FIG. 2C the locking forward pin 124 is shown in its retracted position 220 within the locking pin tube 120, shown in section. In this example, the locking forward pin 124 includes a peg 228 attached perpendicularly to the forward locking pin 124 that moves within a locking pin guide 230 cut into the locking pin tube 120. The locking pin guide 230 includes a longitudinal straight section and a perpendicular detent 234 out the outside end. A spring 224, shown compressed, provides pressure against the end of the locking forward pin 124, tending to force it toward its extended position. In the position shown, the peg 228 (and thus the locking forward pin 124) is held in place against the pressure of the spring by a detent in the locking pin guide 230. It will be readily understood that releasing the locking forward pin 124 from the retracted position requires only that the peg 228 be rotated axially to position it in the longitudinal straight section of the locking pin guide 230. Once rotated, the locking forward pin 124 may be freely forced by the spring 224 toward its extended position, as shown in FIG. 2D where it is seen that the peg 228 is extended to and stopped at the end of the locking pin guide 230, with the forward locking pin 120 is in its extended position.

FIGS. 3A-E depict right side views of an example method of coupling a raised seat skate 104 to a vehicle seat. For ease of description, only right side views are provided of a right, and it will be appreciated that similar components on the left side are also present, though not visible, and operate in substantially the same way as described for the components shown on the right side. That is, assuming that the vehicle seat 304 latches into right and left vehicle seat bases 316, there may therefore also be a left seat skate 103 using substantially identical seat attachment means as described herein on the right side for right seat skate 102. In an embodiment, the left seat skate 103 is a reversed, "mirror image" version of the right seat skate 102. A left seat skate 103 may be substantially the same as a right seat skate 102 except, for example, opposite dispositions of the locking pin tube 120, locking forward pin 124, and locking pin receiver 138. Such an arrangement may advantageously allow the locking forward pin 124 to extend inward and thus be most easily accessible by a user.

Figure 3A:
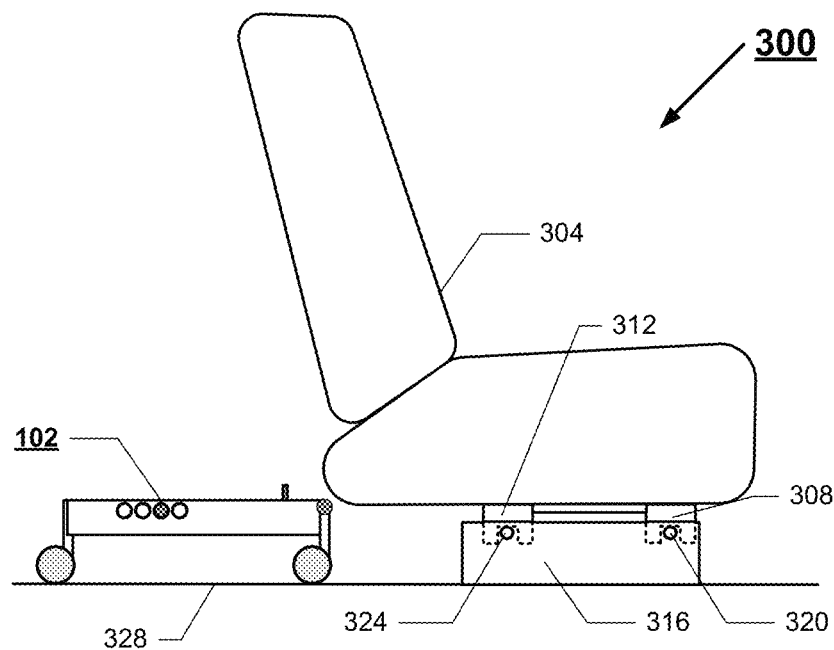
FIGS. 3A-E depict a right side view of an example method of coupling one or more seat skates that use a raised chassis to a vehicle seat.

In FIG. 3A, a right side view 300 shows a right seat skate 102 positioned on a vehicle floor 328 behind a seat 304 to be removed. Though not visible from this view, it should be understood that the locking forward pin 124 of the right seat skate 102 is in the retracted position. The seat 304 is coupled using a seat forward attachment 308 and a seat rear attachment 312 to a seat base 316, which in turn may be rigidly attached to the vehicle floor 328. One or both a seat forward attachment 308 and a seat rear attachment 312 often include latches that couple respectively to a forward base attachment pin 320 and a rear base attachment pin 324. The seat base 316 in this example rises above the vehicle floor 328 and includes parallel sides providing an open channel in between at the top, with the forward and rear base attachment pins 320, 324 rigidly attached within the channel. The forward and rear seat attachments 308, 312 slip into the channel of the seat base 316 and latch respectively onto the forward and rear base attachment pins 320, 324 within the channel.

Figure 3B:
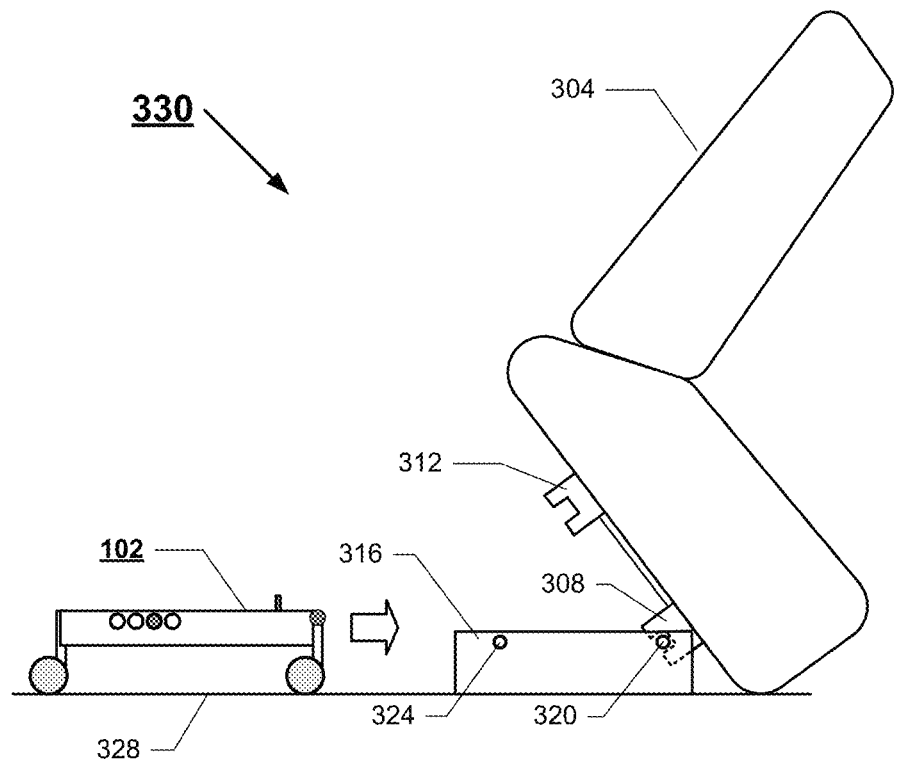

FIG. 3B is a right side view 330 showing the seat 304 decoupled from the seat base 316, rotated forward, and the right seat skate 102 rolling into position on the vehicle floor 328. In this example, the seat rear attachment 312 is unlatched from the rear base attachment pin 324 allowing the seat 304 to be rotated forward and pivoted on the seat forward attachment 308 at the forward base attachment pin 320. It is also contemplated that both the seat rear attachment 312 and the seat forward attachment 308 are unlatched or have been somehow decoupled from the forward and rear base attachment pins 320, 324. With the seat 304 in the raised and rotated position, the right seat skate 102 may be laterally aligned from behind with the seat base 316 and rolled forward on the vehicle floor 328 (i.e., to the right in this view), allowing the right seat skate 102 to straddle the seat base 316 as it is rolled forward. As mentioned above, the raised chassis 104 is high enough to clear the seat base 316. In particular, raised chassis 104 straddles the seat base 316 and is high enough that all components of a right or left seat skate 102, 103 including at least the locking forward pin 124 and seat rear support pin 118 clear the top of the seat base 316.

Figure 3C:
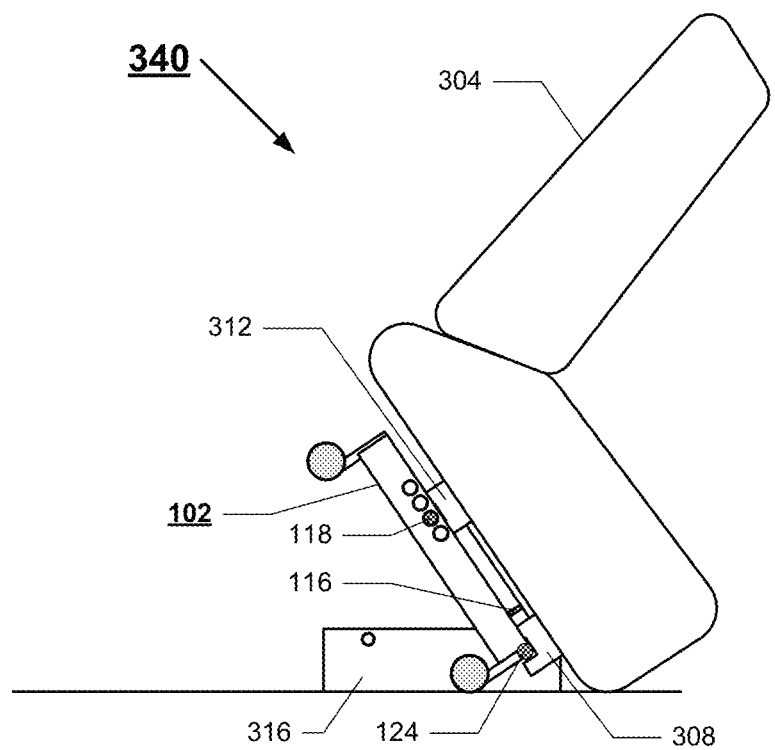

FIG. 3C is a right side view 340 showing the right seat skate 102 rotated upward and coupled to the seat 304. In this example, the seat rear support pin 118 in the right seat skate 102 has previously been positioned in an appropriate mounting hole 117B (see FIG. 1A) to match the location of the seat rear attachment 312 relative to the seat forward attachment 308. When the right seat skate 102 is rotated upward, the seat rear support pin 118 is guided into the latch of the seat rear attachment 312 and the optional fulcrum 116 rests against the bottom of the seat 304. As discussed above, the fulcrum 116 may provide leverage against, and support of, the seat 304 while lifting and attaching the seat skate 102 to the seat forward attachment 308, in addition to maintaining appropriate spacing between the right seat skate 102 and the bottom of the seat 304 to aid with latching of the seat rear attachment 312. At this point, the forward locking pin 124 in its retracted state may align with the latch of the seat forward attachment 308. It should be understood that forward locking pin 124 may still be in its retracted position.

Figure 3D:
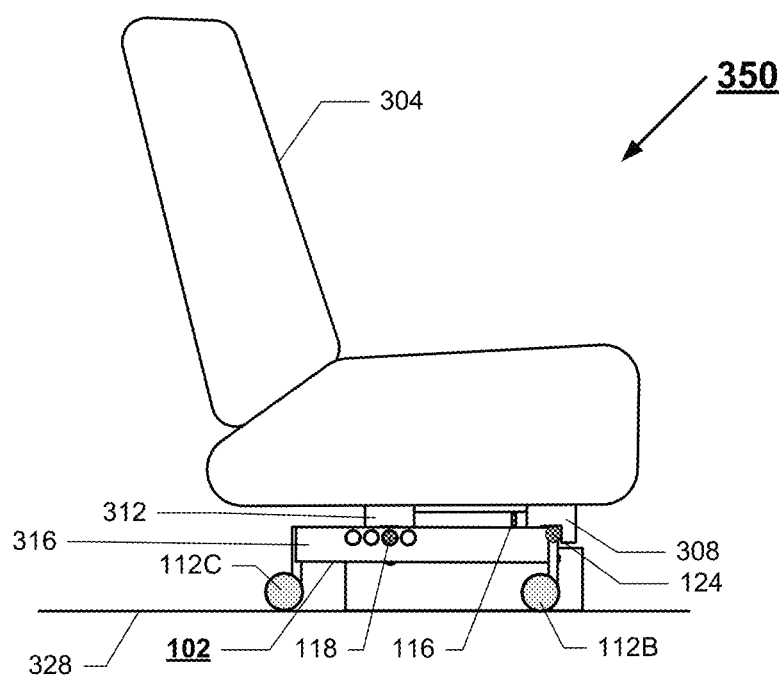

FIG. 3D is a right side view 350 showing the seat 304 and right seat skate 102 assembly rotated downward together until resting on the vehicle floor 328 on the casters 112A-C. At this time the forward locking pin 124 may be put into its extended position (see FIGS. 2B, 2D), thus effecting a latch with the seat forward attachment 308 and securely locking the seat 304 to the right seat skate 102. The weight the seat 304 is now supported by the forward locking pin 124, fulcrum 116 (optionally installed), and seat rear support pin 118.

Figure 3E:
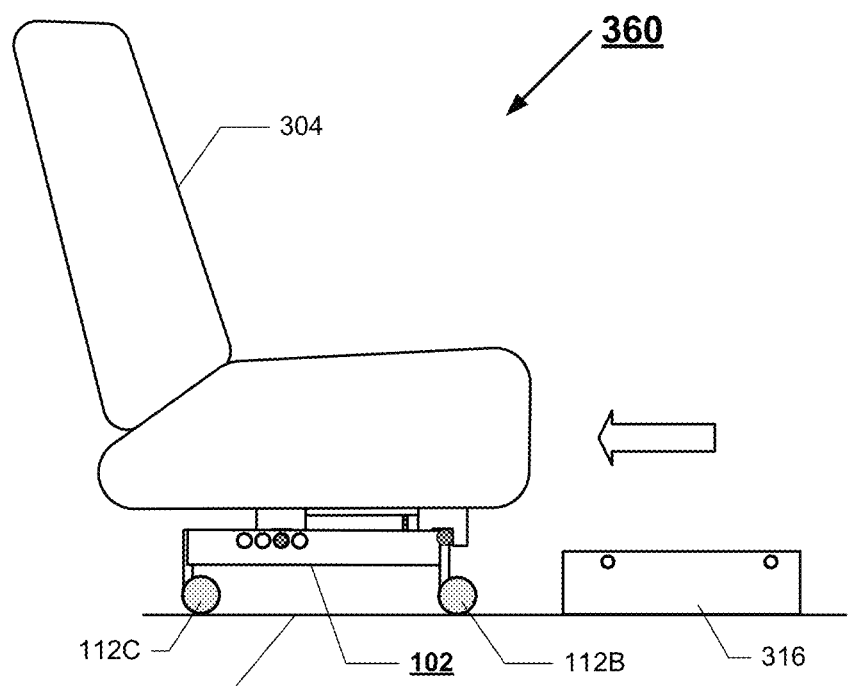

FIG. 3E is a right side view 360 showing the seat 304 and right seat skate 102 assembly being rolled away from the seat base 316 on the vehicle floor 328. As shown, the assembly may be moved rearward on the vehicle floor 328, but it will be appreciated that it may as easily be rolled forward depending upon space available within the vehicle for movement and the location of vehicle doors for removal of the seat 304 and right seat skate 102 assembly. In an embodiment, the caster post 108C is positioned off-center on the chassis rear plate 122, as described above, thus positioning the rear caster 112C off-center as well. As such, the right seat skate 102 and seat 304 assembly may more easily be moved forward in that the rear caster 112C may advantageously roll on the vehicle floor 328 to a side of the vehicle seat base 316 and thus its raised structure. Once removed from the vehicle, the seat 304 and right seat skate 102 assembly may be transported as desired to a location of the user's choice for storage or use possibly as a chair or bench.

Though not depicted, after transport to the desired location, the right seat skate 102 and left seat skate 103 may be detached from the seat 304 in a reverse manner to which they were attached. The right and left seat skates 102, 103 may then be used to move seats from the same or other vehicles. It will be appreciated, too, that reinstalling the seat 304 into a vehicle is substantially the reverse of the process depicted in FIGS. 3A-E.

Figure 3F:
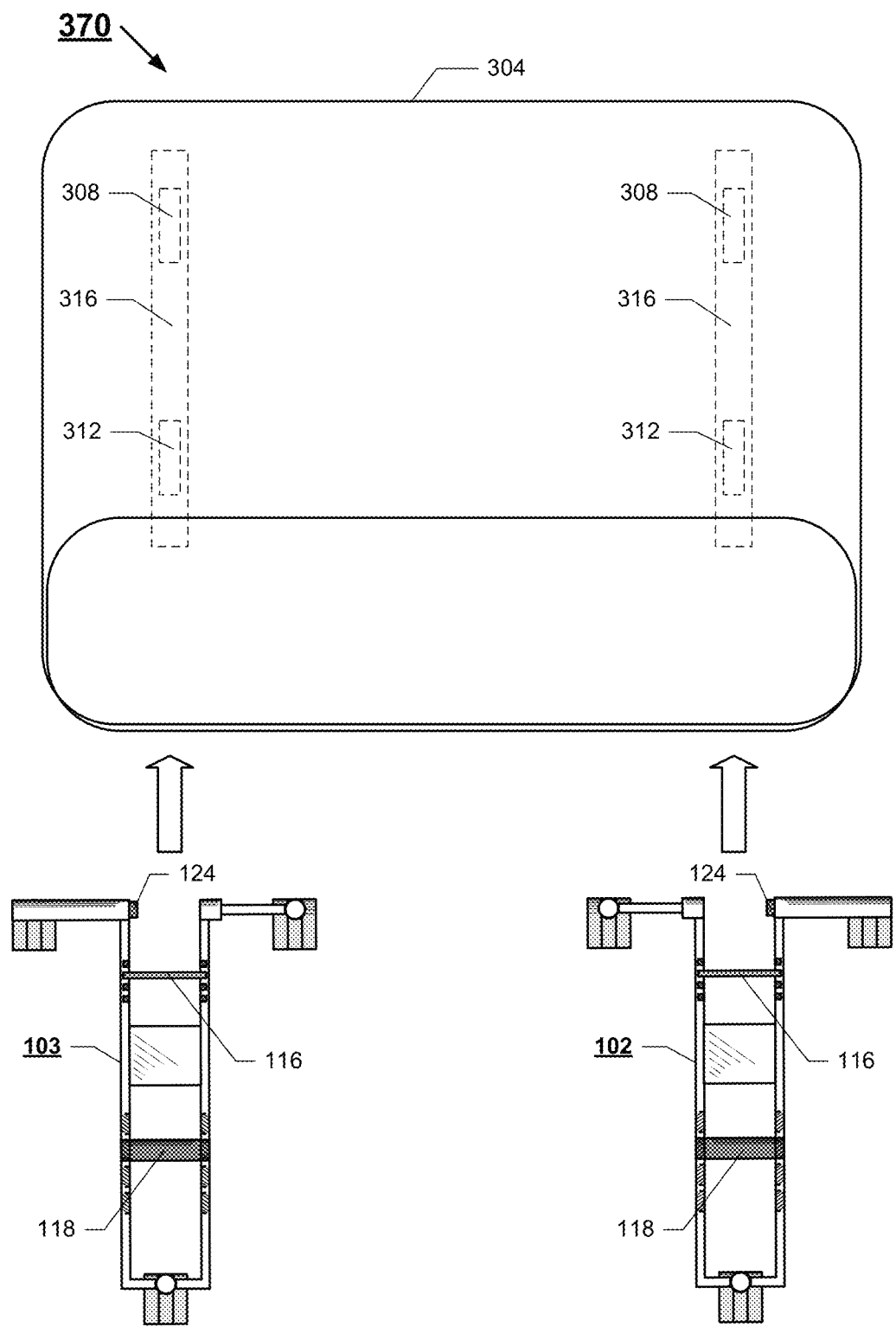
FIG. 3F depicts a top view in which right and left seat skates using a raised chassis aligned for coupling to the vehicle seat.

FIG. 3F is a top view 370 depicting right and left seat skates 102, 103 positioned in alignment with the vehicle seat bases 316 of the seat 304. Also shown are the forward and rear seat attachments 308, 312 of the seat 304. After the seat 304 (with the forward and rear seat attachments 308, 312) is rotated upward, the right and left seat skates 102, 103 may be rolled forward (see arrows) to straddle respective vehicle seat attachment means such as seat bases 316. When the right and left seat skates 102, 103 are in position under the seat 304, they may be rotated upward from the rear and guided such that the rear seat attachments 312 latch onto the seat rear support pins 118 of the right and left seat skates 102, 103, and that the forward seat attachments 308 align with the forward locking pins 124. The seat 304, with seat skates 102, 103 attached at the rear seat attachments 312, may then be lowered. Once the weight of the seat 304 is on the right and left seat skates 102, 103, the forward locking pins 124 may be extended to effect a latch with the forward seat attachments 308. It will be appreciated that in this example the two seat skates 102, 103 are depicted in the top view in opposite configurations, advantageously exposing the forward locking pin 124 for each outward for convenient access by the user. Depending on the forward locking pin 124 extension mechanism used, other advantageous orientations of the forward locking pin 124 for ease of access may be appropriate.

FIGS. 4A-C, 5A-B, and 6A-F describe seat skates 402, 403. It will be observed that right and left seat skates 402, 403 are similar in most respects to right and left seat skates 102, 103 described in the foregoing, and that a fundamental difference between the two implementations lies their contemplated applications. I.e., where right and left seat skates 102, 103 may be used with a seat 304 mounted on a raised vehicle seat base 316 mounted on a vehicle floor 328, right and left seat skates 402, 403 may be used with a seat 304 that attaches to a seat track 616 (see, for example, FIG. 6A) that is recessed into a vehicle floor 328. Accordingly, right and left seat skates 402, 403 advantageously use a lowered chassis 404 as compared with the comparatively higher raised chassis 104 of right and left seat skates 102, 103. As discussed in more detail below, the lowered chassis 404 is disposed at a height above the vehicle floor to allow proximity to a seat track 616 recessed into the vehicle floor 328 as shown in at least FIGS. 6A-6E. That is, the bottom surface of the lowered chassis 404 is high enough to not drag on a vehicle floor 328 while still low enough that it can advantageously roll underneath a raised and rotated seat 304 and latch with a seat forward attachment 608, as discussed with regard to FIGS. 6A-6E.

Figure 4A:
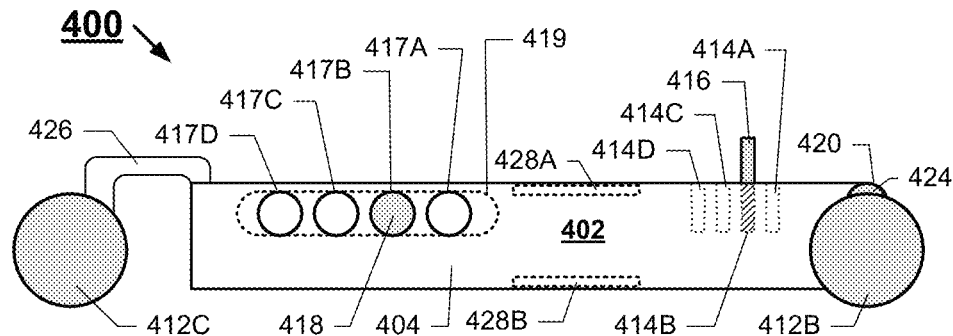
FIGS. 4A-C are respectively right, front, and left side views of an example seat skate including a lowered chassis, three casters, a forward locking pin, a seat rear support pin, and an optional load-bearing fulcrum.

FIG. 4A depicts a right side view 400 of an example right seat skate 402. A front caster 412B and rear caster 412C are shown, the rear caster 412C attached to the lowered chassis 404 by caster support arm 426, which in various embodiments allows the caster 412C to swivel freely.

FIG. 4A depicts a right side view 400 of an example right seat skate 402. Embodiments provide for the right seat skate 402 to include a multiplicity of casters, as will be shown in FIGS. 4A-C in which an example with three casters 412A-C is depicted. Accordingly, in FIG. 4A a front caster 412B and rear caster 412C are shown, the rear caster 412C attached to the lowered chassis 404 by caster support arm 426, which in various embodiments allows the caster 412C to swivel freely.

Further, as discussed above with regard to the raised chassis 104, aspects of the lowered chassis 404 may be described likewise as having "longitudinal" and "transverse" dispositions. A longitudinal disposition will again be understood as being front-to-back, or in the example of FIGS. 4A-C as described below, along an axis defined by the centers of a load-bearing fulcrum 416, a chassis support 428A, 428B, and/or a (rear) caster support arm 426, where "front" will be understood to be at or near the chassis front plates 434A, 434B and the "rear" to be at or near the caster support arm 426. The terms "fore" and "aft" may be used to refer to relative longitudinal positions where "fore" corresponds with front and "aft" corresponds with rear.

An optional adjustable load-bearing fulcrum 416 (also referred to herein simply as "fulcrum 416") may be used for leverage exerted upon, and additional support for, a seat 304 (see FIG. 6A, for example) as described in more detail below. In an embodiment, the fulcrum 416 is rigidly mounted on lowered chassis 404 and may provide added structural support to the raised chassis 104. Means may be provided for adjustably mounting the fulcrum 416 on lowered chassis 404. In some embodiments, a multiplicity of fulcrum positioning slots 414A-D may be disposed longitudinally (i.e., front to back) on lowered chassis 404 to provide discrete positioning options. For example, the fulcrum 416 as depicted is placed in fulcrum positioning slot 414B but may be placed in any of a multiplicity of fulcrum positioning slots 414A-D depending upon characteristics of the seat 304 and/or circumstances related to coupling the right seat skate 402 to the seat 304. It will be appreciated that more, or fewer, slots such as fulcrum positioning slots 414A-D may be implemented to provide lesser or greater range and/or less or more granularity in longitudinal positioning of the fulcrum 416. Further, fulcrum 416 may be any of multiple versions (not shown) using varying vertical heights, selected for implementation appropriate to the characteristics of the seat 304 and/or circumstances related to coupling the right seat skate 402 to the seat 304.

A seat rear support pin 418 coupled to the raised chassis 104 provides a rear coupling point for engaging with the seat 304 at a seat rear attachment 612 and may additionally provide support for the weight of the seat 304. In an embodiment, the seat rear support pin 418 may be rigidly attached to lowered chassis 404. In other embodiments, means may be provided for adjustably mounting the seat rear support pin 418 on lowered chassis 404. In an embodiment, a multiplicity of mounting holes 417A-D into which the seat rear support pin 418 may be inserted may be disposed longitudinally (i.e., front to back) on lowered chassis 404 to provide discrete positioning options. For example, as depicted, the rear support pin 418 is placed in a mounting hole 417B but may be placed in any of mounting holes 417A-D depending upon characteristics of the seat 304 and/or circumstances related to coupling the right seat skate 402 to the seat 304. It is contemplated that more, or fewer, holes such as mounting holes 417A-D may be implemented to provide lesser or greater range and/or less or more granularity in the positioning of the rear support pin 418. In an embodiment, a slot 419 may be used for continuous positioning of the rear support pin 418 in place of discrete mounting holes 417A-D. To use a slot 419, it is contemplated that the seat rear support pin 418 would further comprise a latching means to secure its position in the right seat skate 402 once it has been located back to front (i.e., left to right, as drawn) in the slot 419. Such a slot 419 provides increased granularity over mounting holes 417A-D for positioning the seat rear support pin 418, and its length can be designed to accommodate a desired positioning range for the seat rear support pin 418.

A locking forward pin 424 provides a forward coupling point for coupling with the seat 304 at a seat forward attachment 608 and provides additional support for the weight of the seat 304.

Locking pin tube 420 acts as a sheath about locking forward pin 424 and may house various retracting/extending means for the locking forward pin 424. As discussed above with regard to locking forward pin 124, locking forward pin 424 may similarly be in a retracted state as the right seat skate 402 is fitted to the bottom of the seat 304. Once fitted, locking forward pin 424 may be extended to prevent the right seat skate 402 from uncoupling from the front of seat 304 as it is moved, lifted, and/or rolled on casters 412A-C.

Embodiments provide for optional upper and lower chassis supports 428A, 428B, respectively, shown in hidden cross-section view in FIG. 4A, as transverse stiffening elements for lowered chassis 404. It is contemplated that one, both, or neither of chassis supports 428A, 428B may be used according to design and implementation requirements and/or load bearing characteristics of a particular right seat skate 402.

Figure 4B:
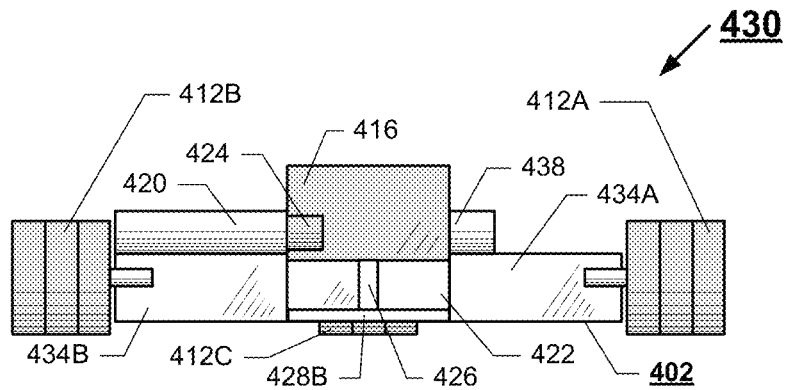

FIG. 4B depicts a front view 430 of the example right seat skate 402. Extending the foregoing description of the right seat skate 402 related to FIG. 4A, further shown in FIG. 4B are left (as viewed from above) front caster 412A attached to the lowered chassis 404. Chassis rear plate 422 is visible in the front view 430, to which the caster support arm 426 is attached. In various embodiments the caster support arm 426 is centrally disposed in relation to the chassis rear plate 422, as shown, thus centrally disposing the rear caster 412C to the right seat skate 402 overall. It will be appreciated that it is not strictly necessary to dispose the rear caster 412C centrally to the right seat skate 402. It is contemplated that various implementations may call for a design including an off-center location for the rear caster 412C.

In the front view 430, locking forward pin 424 is shown retracted into the locking pin tube 420, which is attached to chassis front plate 434B. Attached to chassis front plate 434A is locking pin receiver 438, which is aligned axially with locking pin tube 420, and which receives and supports the locking forward pin 424 when it is in its extended state. As discussed above with, "aligned axially" likewise refers here to an alignment of central axes of cylinders defined by the locking pin tube 420, locking forward pin 424, and locking pin receiver 438. Thus, in its extended state locking forward pin 424 is rigidly supported at both ends, by locking pin tube 420 and locking pin receiver 438. Lower chassis support 428B is visible in the front view 430, as is the forward-facing surface of fulcrum 416. The foregoing description of example locking forward pin 124 in FIGS. 2C and 2D may apply similarly to the operation of locking forward pin 424.

It will be appreciated that the locking forward pin 124 is substantially the only moving component of the right and left seat skates 402, 403, and therefore advantageously contributes to the overall simplicity in design and manufacture.

Figure 4C:
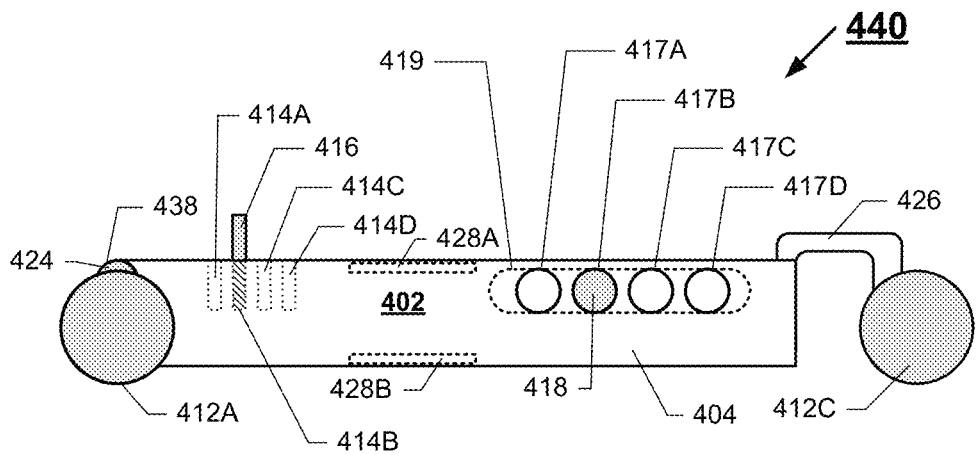

FIG. 4C depicts a left side view 440 of the example right seat skate 402. FIG. 4C depicts elements also shown in FIGS. 4A and 4B, and the reader is directed to the foregoing discussions relating to FIGS. 4A and 4B for elucidation.

Figure 5A:
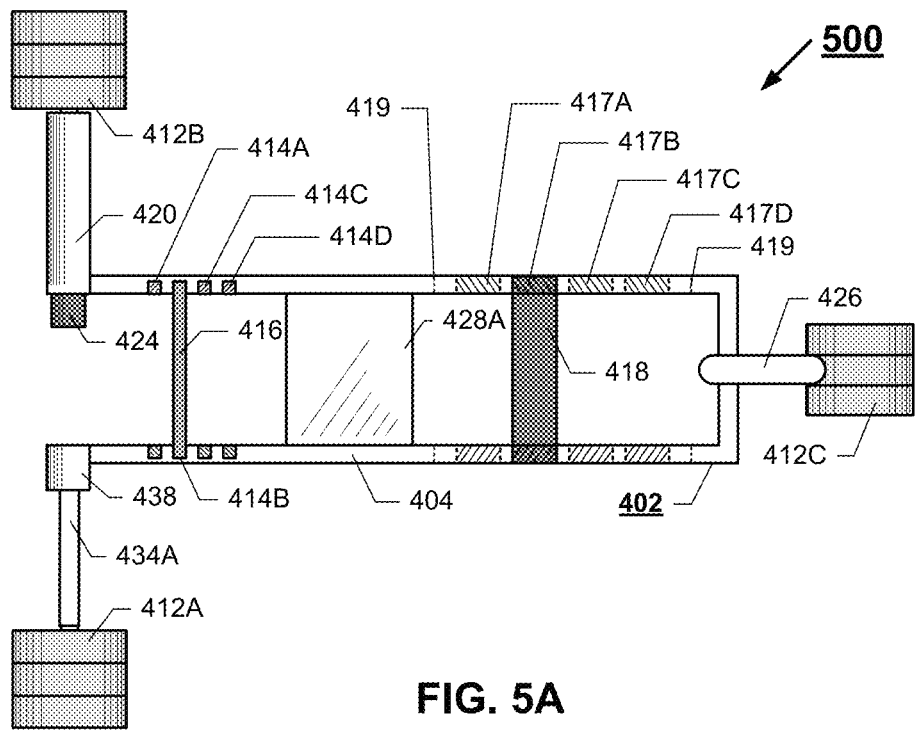
FIGS. 5A and B are top views of the example of FIGS. 4A-C, showing a locking forward pin implementation respectively in retracted (unlocked) and extended (locked) positions.
Figure 5B:
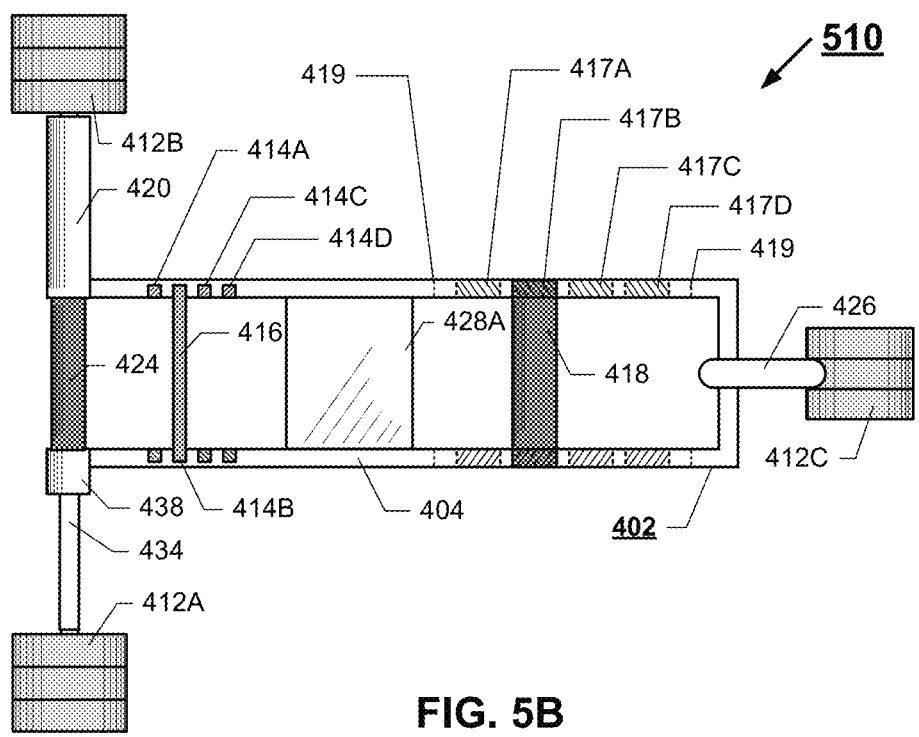

FIGS. 5A and 5B show top views 500, 510 of right seat skate 402. In FIG. 5A, the locking forward pin 424 is shown in its retracted position, such as when the right seat skate 402 is not coupled to a seat 304. In FIG. 5B, the locking forward pin 524 is shown by contrast in its extended position with the extended end sheathed by the locking forward pin receiver 438, such as when the right seat skate 402 is coupled with seat 304. All of the casters 412A-C are shown, and it is noted here additionally that all or any of them may include a locking mechanism to prevent undesired rolling while coupled or not with the seat 304.

FIGS. 6A-E depict right side views of an example method of coupling a lowered seat skates 404 to a vehicle seat 304. For ease of description, only right side views are provided, and it will be appreciated that similar components on the left side are also present, though not visible, and operate in substantially the same way as described for the components shown on the right side. That is, assuming that the vehicle seat 304 latches into right and left vehicle seat bases 616, there is therefore a left seat skate 403 using substantially identical seat attachment means as described herein for the right side for right seat skate 402. In an embodiment, the left seat skate 403 is a reversed, "mirror image" version of the right seat skate 402. A left seat skate 403 may be substantially the same as a right seat skate 402 except, for example, opposite dispositions of the locking pin tube 420, locking forward pin 424, and locking pin receiver 438. Such an arrangement may advantageously allow the locking forward pin 424 to extend inward and thus be most easily accessible by a user.

Figure 6A:
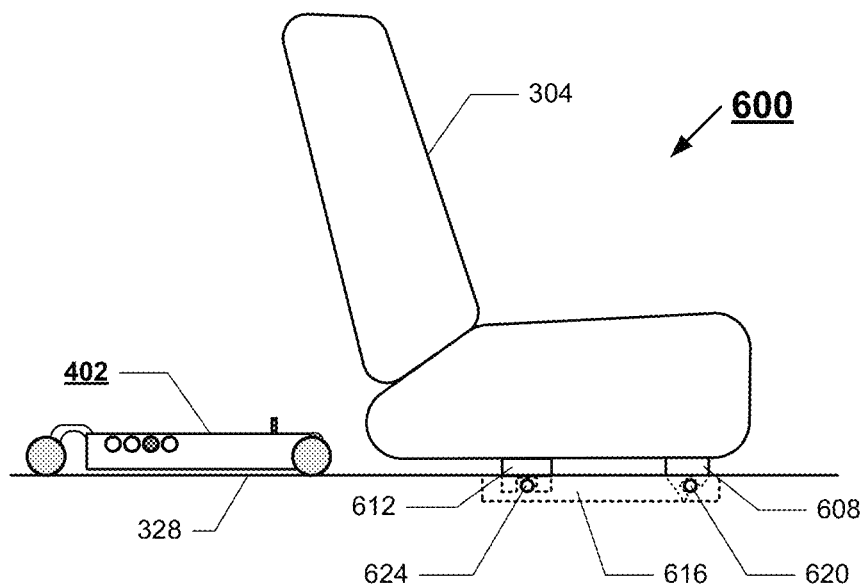
FIGS. 6A-E depict a right side view of an example method of coupling one or more seat skates that use a lowered chassis to a vehicle seat.

In FIG. 6A, a right side view 600 shows a right seat skate 402 positioned on a vehicle floor 328 behind a seat 304 to be removed. Though not visible in this view, it should be understood that the locking forward pin 424 of the right seat skate 402 is in the retracted position. The seat 304 is coupled to the vehicle floor 328 using a seat forward attachment 608 and a seat rear attachment 612 into a recessed seat track 616, which in turn may be rigidly attached to the vehicle floor 328. One or both a seat forward attachment 608 and a seat rear attachment 612 often include latches that couple respectively to a forward base attachment pin 620 and a rear base attachment pin 624. The seat track 616 in this example comprises an open channel (e.g., slot) disposed in the vehicle floor 328, with the forward and rear base attachment pins 620, 624 rigidly attached within the channel. The forward and rear seat attachments 608, 612 slip into the channel of the seat track 616 and latch respectively onto the forward and rear base attachment pins 620, 624 within the channel.

Figure 6B:
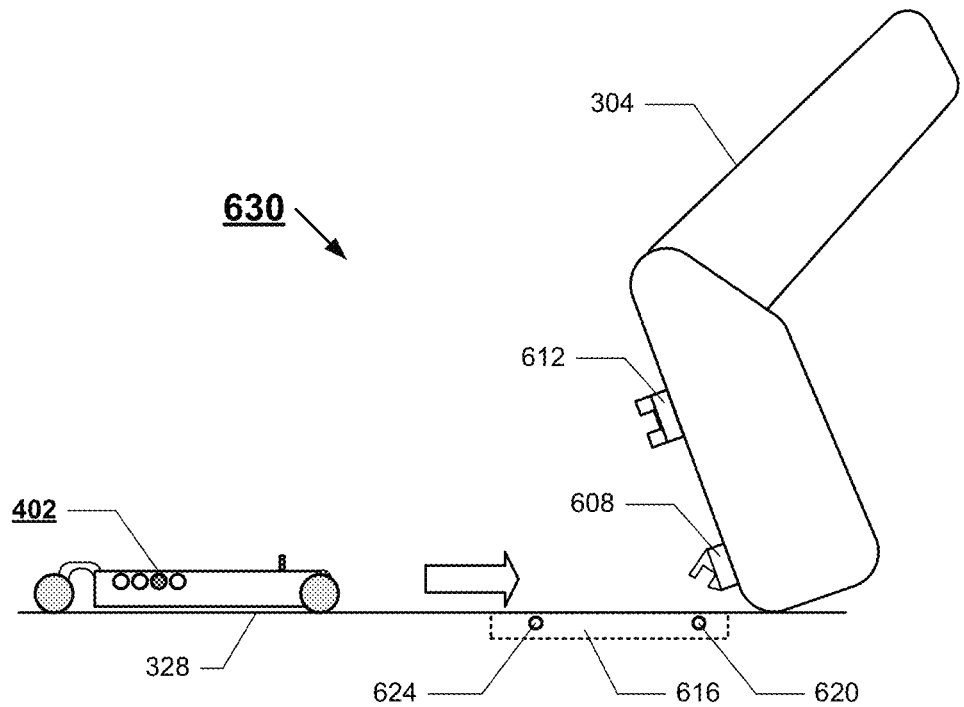

FIG. 6B is a right side view 630 showing the seat 304 decoupled from the seat track 616, rotated forward, and the right seat skate 402 rolling into position on the vehicle floor 328. In this example, the seat rear attachment 612 is unlatched from the rear base attachment pin 624 allowing the seat 304 to be rotated forward and pivoted on the seat forward attachment 608 at the forward base attachment pin 620. It is also contemplated that both the seat rear attachment 612 and the seat forward attachment 608 are unlatched or have been decoupled from the forward and rear base attachment pins 620, 624. With the seat 304 in the raised and rotated position, the right seat skate 402 may be laterally aligned from behind with the seat track 616 and rolled forward on the vehicle floor 328 (i.e., to the right in this view), placing the right seat skate 402 in a position over and straddling the seat track 616. As mentioned above, the bottom surface of the lowered chassis 404 is high enough to not drag on the vehicle floor 328 while still low enough that it can advantageously roll underneath a raised and rotated seat 304 and latch with a seat forward attachment 608.

Figure 6C:
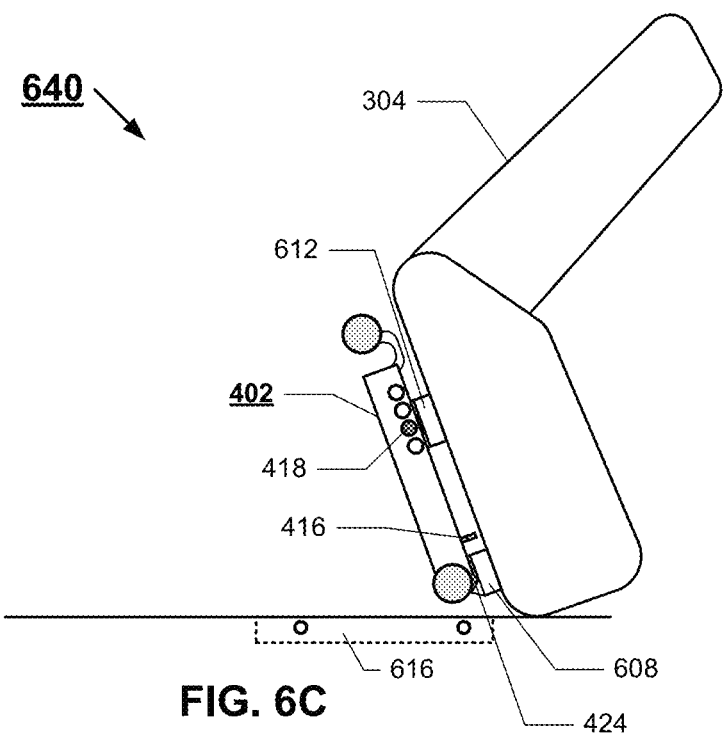

FIG. 6C is a right side view 640 showing the right seat skate 402 rotated upward and coupled to the seat 304. In this example, the seat rear support pin 418 in the right seat skate 402 has previously been positioned in an appropriate mounting hole 417B (see FIG. 4A) to match the location of the seat rear attachment 612 relative to the seat forward attachment 608. When the right seat skate 402 is rotated upward, the seat rear support pin 418 is guided into the latch of the seat rear attachment 612 and the optional fulcrum 416 rests against the bottom of the seat 304. As discussed above, the fulcrum 416 may provide leverage against, and support of, the seat 304, in addition to maintaining appropriate spacing between the right seat skate 402 and the bottom of the seat 304 to aid with latching of the seat rear attachment 612. At this point, the forward locking pin 424 in its retracted state may align with the latch of the seat forward attachment 608. It should be understood that forward locking pin 424 may still be in its retracted position.

Figure 6D:
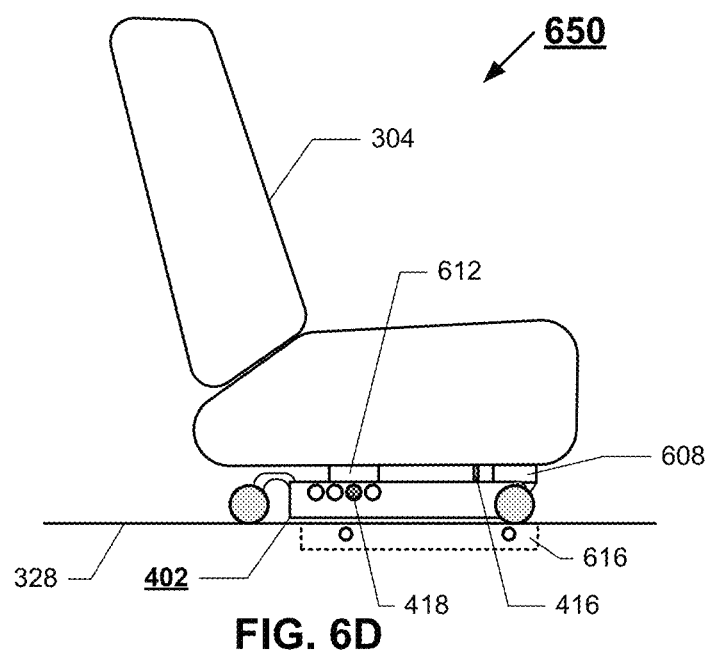

FIG. 6D is a right side view 650 showing the seat 304 and right seat skate 402 assembly rotated downward together until resting on the vehicle floor 328 on the casters 412A-C. At this time the forward locking pin 424 may be put into its extended position (see FIGS. 2B, 2D), thus effecting a latch with the seat forward attachment 608 and securely locking the seat 304 to the right seat skate 402. The weight the seat 604 is now supported by the forward locking pin 424, fulcrum 416 (optionally installed), and seat rear support pin 418.

Figure 6E:
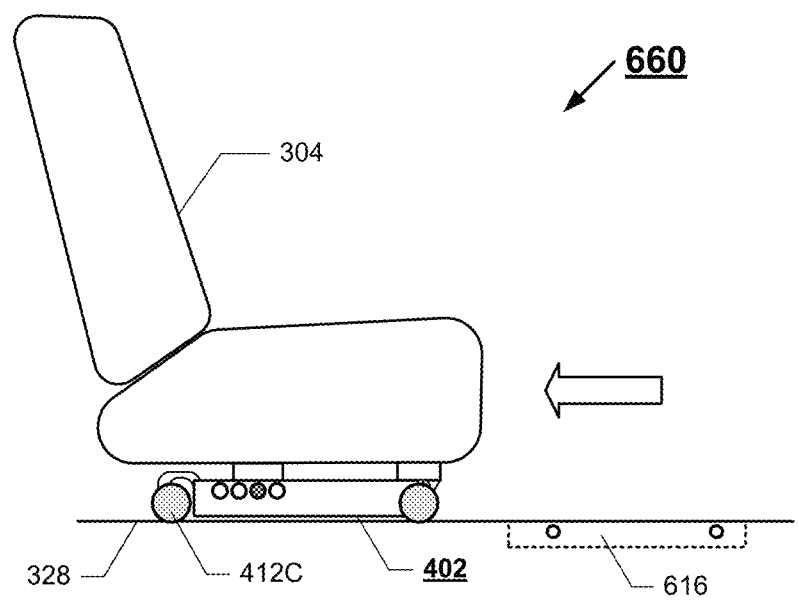

FIG. 6E is a right side view 660 showing the seat 304 and right seat skate 402 assembly being rolled away from the seat track 616 on the vehicle floor 328. As shown, the assembly may be moved rearward on the vehicle floor 328, but it will be appreciated that it may as easily be rolled forward depending upon space available within the vehicle for movement and the location of vehicle doors for removal of the seat 304 and right seat skate 402 assembly. In an embodiment, the caster arm 426 is positioned off-center on the chassis rear plate 422, as described above, thus positioning the rear caster 412C off-center as well. As such, the right seat skate 402 and seat 304 assembly may more easily be rolled forward in that the rear caster 412C may advantageously roll on the vehicle floor 328 to a side of the recessed seat track 616, avoiding its channel. Once removed from the vehicle, the seat 304 and right seat skate 402 assembly may be transported as desired to a location of the user's choice for storage or use possibly as a chair or bench.

Though not depicted, after transport to the desired location, the right seat skate 402 and left seat skate 403 may be detached from the seat 304 in a reverse manner to which they were attached. The right and left seat skates 402, 403 may then be used to move seats from the same or other vehicles. It will appreciated, too, that reinstalling the seat 304 into a vehicle is substantially the reverse of the process depicted in FIGS. 6A-E.

Figure 6F:
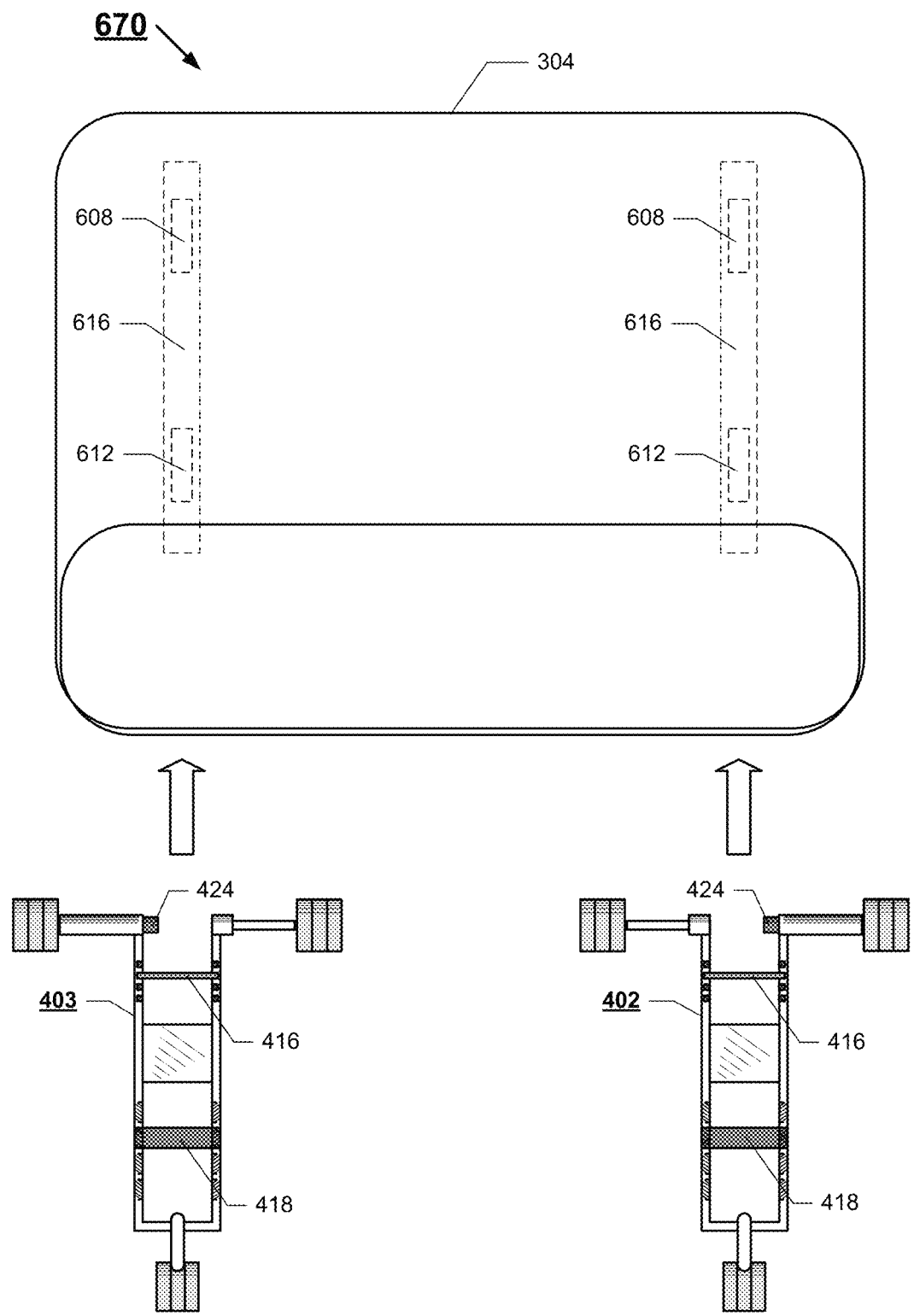
FIG. 6F depicts a top view in which right and left seat skates using a lowered chassis aligned for coupling to the vehicle seat.

FIG. 6F is a top view 670 depicting right and left seat skates 402, 403 positioned in alignment with vehicle seat attachment means such as seat bases 616 of the seat 304. Also shown are the forward and rear seat attachments 608, 612 of the seat 304. After the seat 304 (with the forward and rear seat attachments 608, 612) is rotated upward the right and left seat skates 402, 403 may be rolled forward (see arrows) to straddle respective vehicle seat bases 616. When the right and left seat skates 402, 403 are in position under the seat 304, they may be rotated upward from the rear and guided such that the rear seat attachments 612 latch onto the seat rear support pins 418 of the right and left seat skates 402, 403, and that the forward seat attachments 608 align with the forward locking pins 424. The seat 304, with seat skates 402, 403 attached at the rear seat attachments 612, may then be lowered. Once the weight of the seat 304 is on the right and left seat skates 402, 403, the forward locking pins 424 may be extended to effect a latch with the forward seat attachments 608. It will be appreciated that in this example the two seat skates 402, 403 are depicted in the top view in opposite configurations, advantageously exposing the forward locking pin 424 for each outward for convenient access by the user. Depending on the forward locking pin 424 extension mechanism used, other advantageous orientations of the forward locking pin 424 for ease of access may be appropriate.

Figure 7:
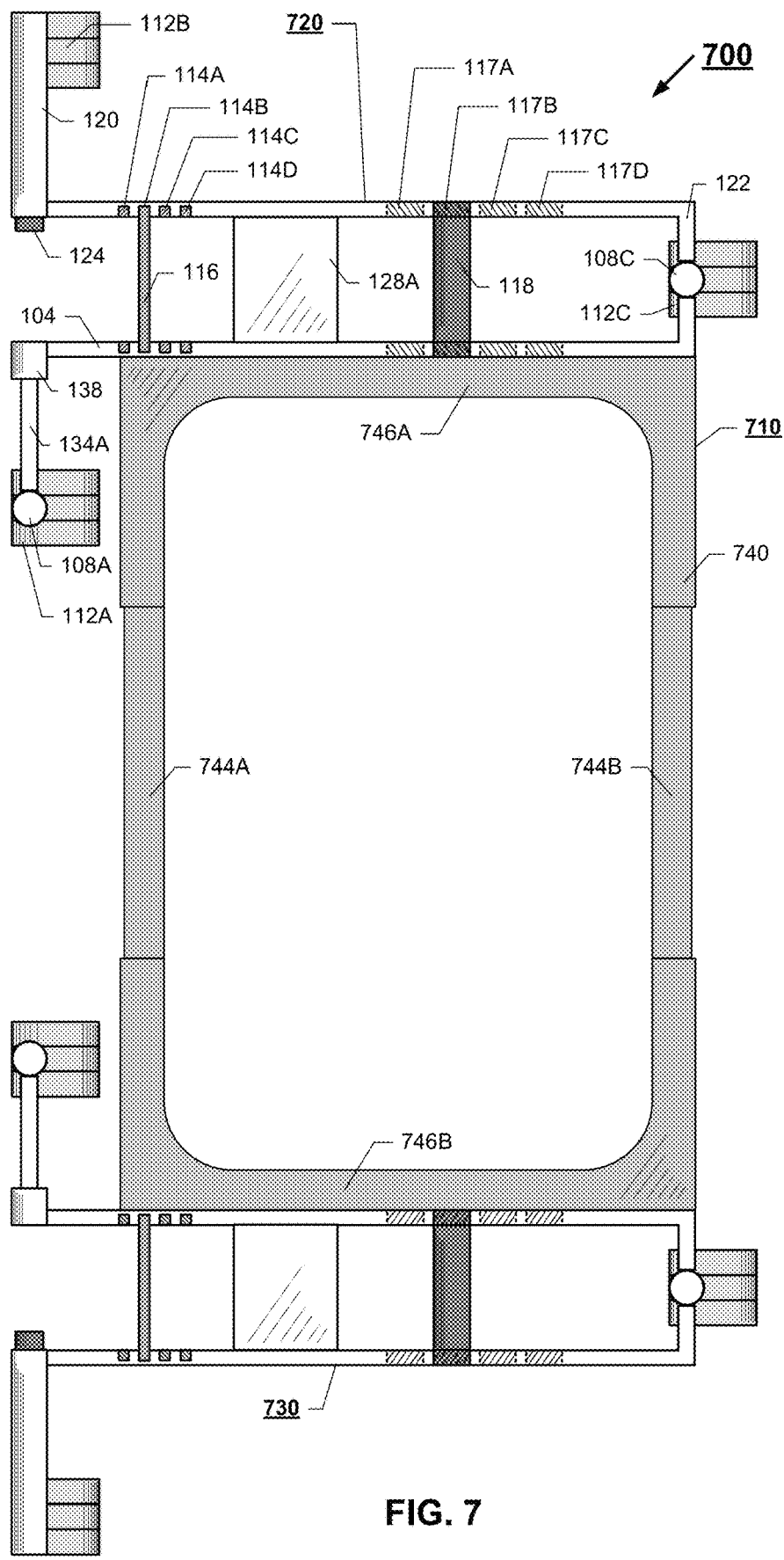
FIG. 7 is a top view of an example single-piece seat skate using a raised chassis.

FIG. 7 is a top view 700 of an example combined raised seat skate 710 using raised chassis. A combined raised seat skate 710 as described herein may be advantageously configured to fit a given width between right and left vehicle seat bases 316 (see e.g., FIG. 8). Thus, a user may use a single pre-configured combined raised seat skate 710 instead of individual right and left seat skates 102, 103, advantageously saving time and effort by attaching a single apparatus to the seat 304 for removal, moving about, and replacement. It will be appreciated that the process of attaching the combined raised seat skate 710 is substantially the same as for both the right or left seat skates 102, 103, individually.

It may be observed that the combined raised seat skate 710 can be characterized as comprising a right seat skate 102 and a left seat skate 103, both using a raised chassis, with a connecting structure 740 rigidly coupling them in between. Accordingly, a right skate assembly 720 and left skate assembly 730 correspond respectively with seat skates 102, 103. In an embodiment not shown, the connecting structure 740 may be removably attachable to seat skates 102, 103, thus allowing the combined raised seat skate 710 to be disassembled and the right and left seat skates 102, 103 used independently. Other embodiments, such as that shown in FIG. 7, provide for non-detachable coupling of the seat skate assemblies 720, 720 to the connecting structure 740.

Most elements of the combined raised seat skate 710 may be substantially the same as those described in the foregoing, with regard to seat skates 102, 103. As shown, many elements of right skate assembly 720 are labeled and correspond to those described above with regard to right seat skate 102, for example, in FIGS. 1A-C and 2A-D. It will be appreciated that like elements of left seat skate assembly 730 are correspondingly labeled but have been omitted from FIG. 7 for conceptual clarity and ease of explanation. It is also contemplated that the individual seat skate assemblies 720, 730 may comprise fewer or more elements. For example, an implementation of seat skate assembly 720 might utilize only casters 112B and 112C while caster 112A, caster post 108A, and chassis front plate 134A are not included.

A connecting apparatus 740 connecting the two seat skate assemblies 720, 730 may be of many variations. In the example shown, the connecting apparatus 740 comprises right and left outer structures 746A, 746B, which are adjustably coupled by width forward and rear adjustment slides 744A, 744B for adjusting the overall width of the combined raised seat skate 710. By moving the seat skate assemblies 720, 730 together or apart with the width adjustment slides 744A, 744B and outer structures 746A, 746B, a desired width for the combined raised seat skate 710 may be achieved. A securing means to fix a width with the width adjustment slides 744A, 744B and outer structures 746A, 746B is not shown in FIG. 7 for conceptual clarity and ease of description. However, it will be appreciated that any of several securing means may be implemented, for example, but not limited to, set screws and/or bolts, clamps, etc., applied to the width adjustment slides 744A, 744B and outer structures 746A, 746B. The use of width adjustment slides 744A, 744B and outer structures 746A, 746B as described represents an example means for achieving an adjustable width and is not intended to be limiting. Moreover, it is contemplated that any structure effectively connecting the right and left seat skate assemblies 720, 730, adjustable in width or fixed, may be used. It will be appreciated that in this example the seat skate assemblies 720, 730 are depicted in opposite configurations, advantageously exposing the forward locking pin 124 for each outward for convenient access by the user.

Figure 8:
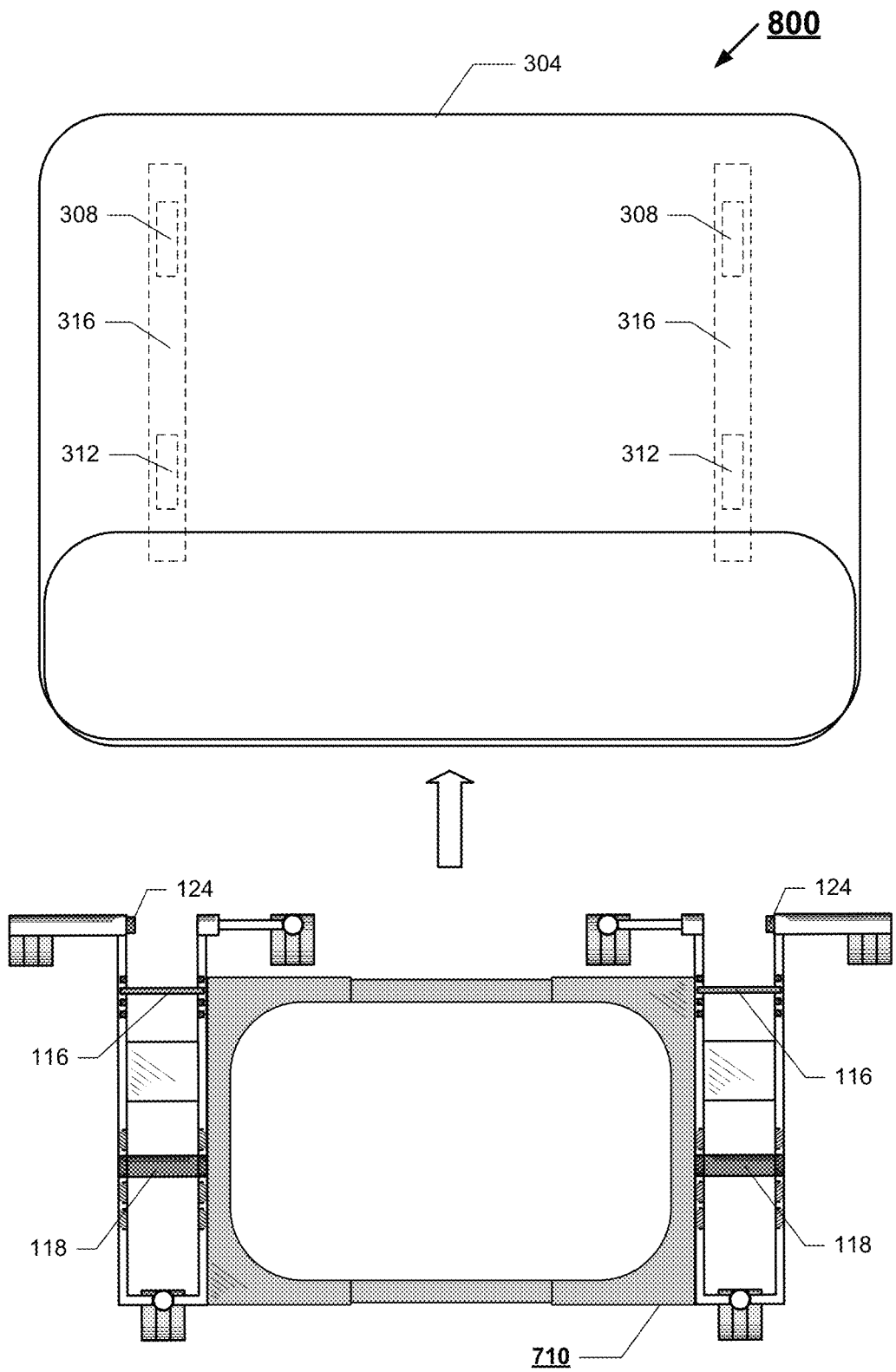
FIG. 8 depicts a top view of an example single-piece seat skate using a raised chassis aligned for coupling to the vehicle seat.

FIG. 8 depicts a top view 800 of combined raised seat skate 710 (using a raised chassis) aligned for coupling to a vehicle seat 304. Similar to the process shown in FIG. 3F, combined raised seat skate 710 is positioned in alignment with the vehicle seat bases 316 of the seat 304. Also shown are forward and rear seat attachments 308, 312 of the seat 304. The seat 304 (with the forward and rear seat attachments 308, 312) may be rotated upward, and the combined seat 710 rolled forward (see arrow) so that seat skate assemblies 720, 730 straddle respective vehicle seat bases 316. When the combined raised seat skate 710 is thus in position under the seat 304, it may be rotated upward from the rear and guided such that the rear seat attachments 312 latch onto the seat rear support pins 118 of the seat skate assemblies 720, 730, and that the forward seat attachments 308 align with the forward locking pins 124. The seat 304, with combined raised seat skate 710 attached at the rear seat attachments 312, may then be lowered. Once the weight of the seat 304 is on the combined raised seat skate 710 the forward locking pins 124 may be extended to effect a latch with the forward seat attachments 308. Depending on the forward locking pin 124 extension mechanism used, other advantageous orientations of the forward locking pin 124 for ease of access may be appropriate.

Figure 9:
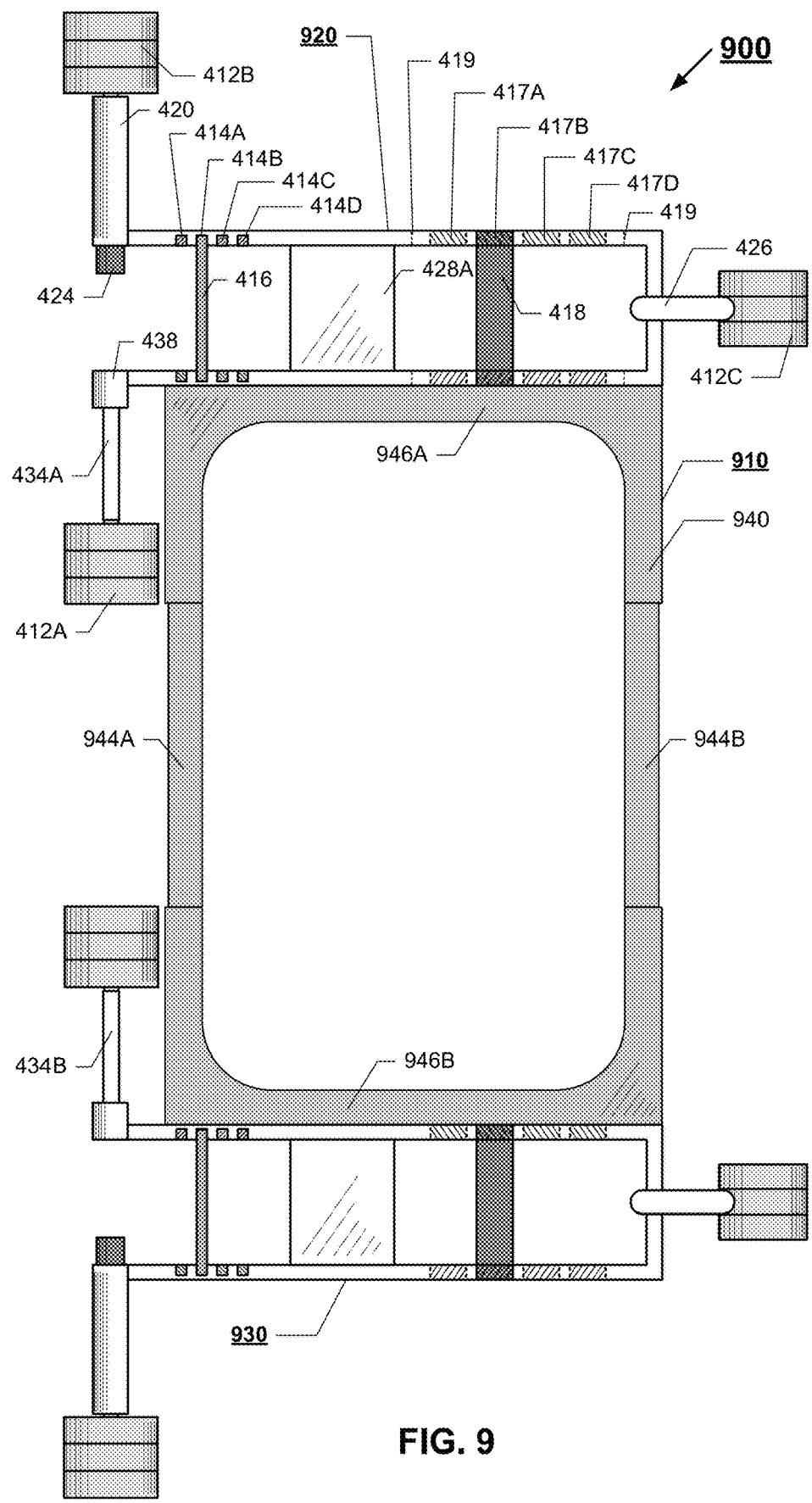
FIG. 9 is a top view of an example single-piece seat skate using a lowered chassis.

FIG. 9 is a top view 900 of an example combined lowered seat skate 910 using lowered chassis. It will be appreciated that the combined lowered seat skate 910 is similar to the combined raised seat skate 710 and that much of the description for the latter applies equally to the former. For clarity, a detailed description of the combined lowered seat skate 910 is provided below.

Figure 10:
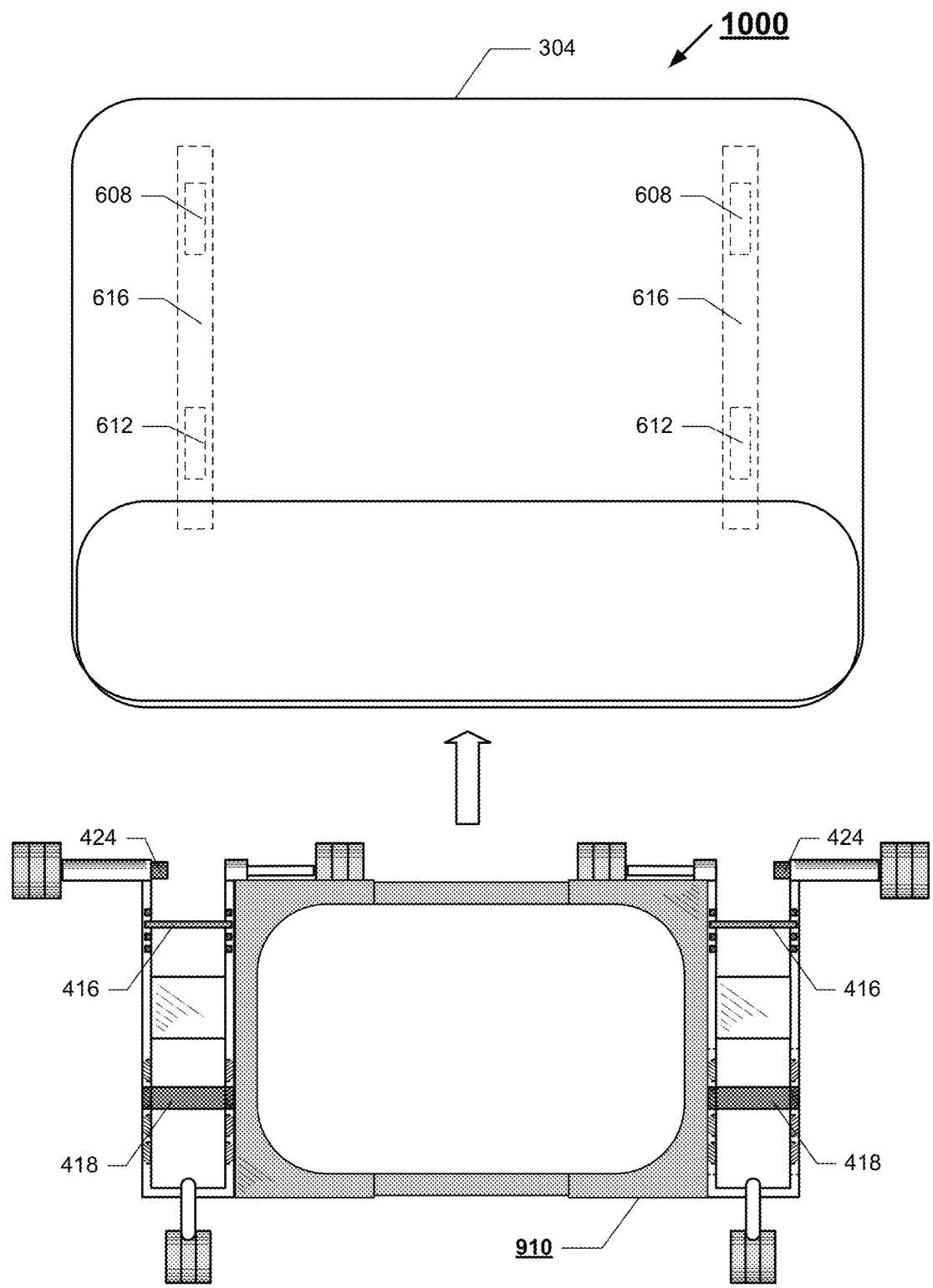
FIG. 10 depicts a top view of an example single-piece seat skate using a lowered chassis aligned for coupling to the vehicle seat.

A combined lowered seat skate 910 as described herein may be advantageously configured to fit a given width between right and left vehicle seat bases 616 (see e.g., FIG. 10). Thus, a user may use a single pre-configured combined lowered seat skate 910 instead of individual right and left seat skates 402, 403, advantageously saving time and effort by attaching a single apparatus to the seat 304 for removal, moving about, and replacement. It will be appreciated that the process of attaching the combined lowered seat skate 910 to a seat 304 is substantially the same as for both the right or left seat skates 402, 403, individually.

It may be observed that the combined lowered seat skate 910 can be characterized as comprising a right seat skate 402 and a left seat skate 403, both using a lowered chassis, with a connecting structure 940 rigidly coupling them in between. Accordingly, a right skate assembly 920 and left skate assembly 930 correspond respectively with right and left seat skates 402, 403. In an embodiment not shown, the connecting structure 940 may be removably attachable to right and left seat skates 402, 403, thus allowing the combined lowered seat skate 910 to be disassembled and the right and left seat skates 402, 403 used independently. Other embodiments, such as that shown in FIG. 9, provide for non-detachable coupling of the seat skate assemblies 920, 920 to the connecting structure 940.

Most elements of the combined lowered seat skate 910 may be substantially the same as those described in the foregoing, with regard to seat skates 402, 403. As shown, many elements of right skate assembly 920 are labeled and correspond to those described above with regard to right seat skate 402, for example, in FIGS. 4A-C and 5A, B. It will be appreciated that like elements of left seat skate assembly 930 are correspondingly labeled but have been omitted from FIG. 9 for conceptual clarity and ease of explanation. It is also contemplated that the individual seat skate assemblies 920, 930 may comprise fewer or more elements. For example, an implementation of seat skate assembly 920 might utilize only casters 412B and 412C while caster 412A and chassis front plate 434A are not included.

A connecting apparatus 940 connecting the right and left seat skate assemblies 920, 930 may be of many variations. In the example shown, the connecting apparatus 940 comprises right and left outer structures 946A, 946B, which are adjustably coupled by forward and rear width adjustment slides 944A, 944B for adjusting the overall width of the combined lowered seat skate 910. By moving the right and left seat skate assemblies 920, 930 together or apart with the width adjustment slides 944A, 944B and outer structures 946A, 946B, a desired width for the combined lowered seat skate 910 may be achieved. A securing means to fix a width with the width adjustment slides 944A, 944B and outer structures 946A, 946B is not shown in FIG. 9 for conceptual clarity and ease of description. However, it will be appreciated that any of several securing means may be implemented, for example, but not limited to, set screws and/or bolts, clamps, etc., applied to the width adjustment slides 944A, 944B and outer structures 946A, 946B. The use of width adjustment slides 944A, 944B and outer structures 946A, 946B as described represents an example means for achieving an adjustable width and is not intended to be limiting. Moreover, it is contemplated that any structure effectively connecting the right and left seat skate assemblies 920, 930, adjustable in width or fixed, may be used. It will be appreciated that in this example the seat skate assemblies 920, 930 are depicted in opposite configurations, advantageously exposing the forward locking pin 424 for each outward for convenient access by the user.

FIG. 10 depicts a top view 1000 of combined lowered seat skate 910 (using a lowered chassis) aligned for coupling to a vehicle seat 304. Similar to the process shown in FIG. 6F, combined lowered seat skate 910 is positioned in alignment with the vehicle seat bases 616 of the seat 304. Also shown are forward and rear seat attachments 608, 612 of the seat 304. The seat 304 (with the forward and rear seat attachments 608, 612) may be rotated upward, and the combined seat 910 rolled forward (see arrow) so that seat skate assemblies 920, 930 straddle respective vehicle seat bases 616. When the combined lowered seat skate 910 is thus in position under the seat 304, it may be rotated upward from the rear and guided such that the rear seat attachments 612 latch onto the seat rear support pins 418 of the seat skate assemblies 920, 930, and that the forward seat attachments 608 align with the forward locking pins 424. The seat 304, with combined lowered seat skate 910 attached at the rear seat attachments 612, may then be lowered. Once the weight of the seat 304 is on the combined lowered seat skate 910 the forward locking pins 424 may be extended to effect a latch with the forward seat attachments 608. Depending on the forward locking pin 424 extension mechanism used, other advantageous orientations of the forward locking pin 424 for ease of access may be appropriate.

Figure 11:
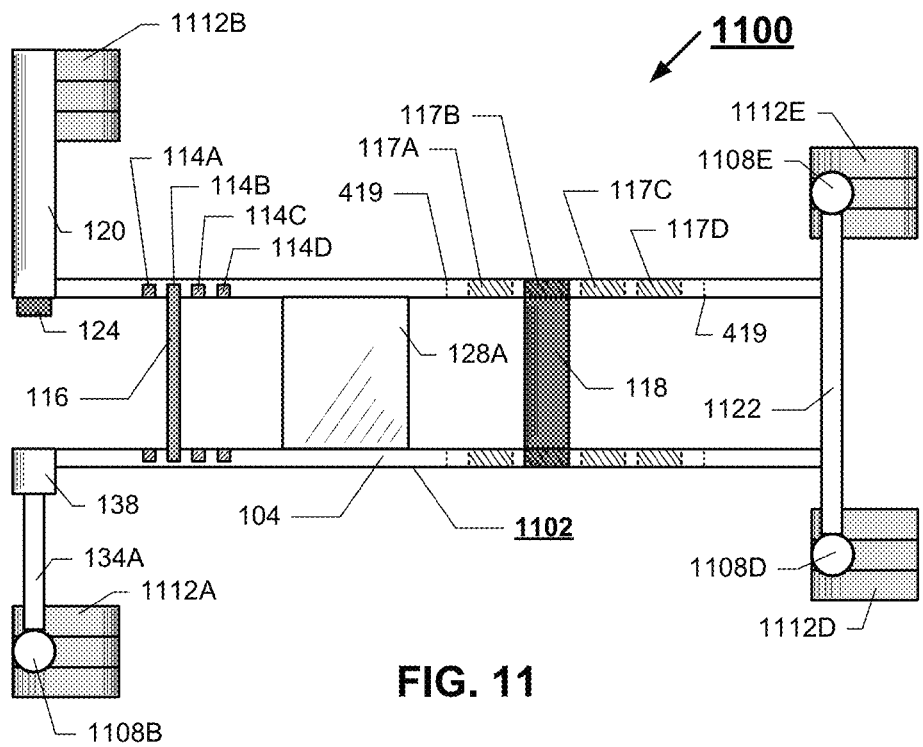
FIG. 11 is a top view of an example 4-caster implementation of a seat skate using a raised chassis.

FIG. 11 is a top view 1100 of an example implementation of a 4-caster raised seat skate 1102 using a raised chassis. It will be appreciated that the difference between the right seat skate 102 (shown for example in FIGS. 1A-C, 2A and B, and 3A-F) and 4-caster raised seat skate 1102 is use of a chassis rear plate 1122, rear caster posts 1108D, 1108E, and swiveling rear casters 1112D, 1112E. The 4-caster raised seat skate 1102 may provide advantageous additional stability and flexibility of use over the 3-caster right seat skate 102. In substantially all respects, operation of the 4-caster raised seat skate 1102 is the same as that described above for right seat skate 102.

Figure 12:
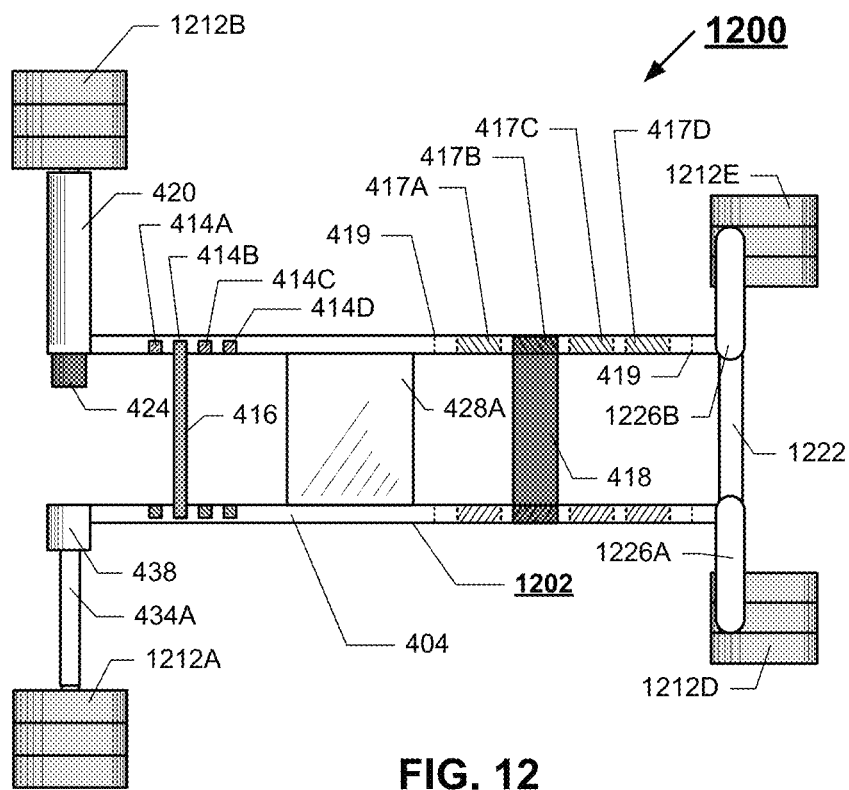
FIG. 12 is a top view of an example 4-caster implementation of a seat skate using a lowered chassis.

FIG. 12 is a top view 1200 of an example implementation 4-caster lowered seat skate 1202 using a lowered chassis. It will be appreciated that the difference between the right seat skate 402 (shown for example in FIGS. 3A-C, 5A and B, and 6A-F) and 4-caster lowered seat skate 1202 is use of a chassis rear plate 1222, rear caster support arms 1226A, 1226B, and swiveling rear casters 1212D, 1212E. The 44-caster lowered seat skate 1202 may provide advantageous additional stability and flexibility of use over the 3-caster right seat skate 402. In substantially all respects, operation of the 4-caster seat skate 1402 is the same as that described above for right seat skate 402.

It is contemplated that embodiments of right and left seat skates 102, 103, 402, 404, raised chassis 104, lowered chassis 404, combined seat skates 710, 910, and 4-caster seat skates 1102, 1202 may be manufactured using many materials including, but not limited to, any combination of metals, plastics, epoxies, resins, ceramics, polyurethanes, additive manufacturing, and polymers, and manufactured in any of many ways including, but not limited to, casting from molds, 3-D printing, and/or component fabrication and assembly by mechanical attachment, welding, and/or fusing.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A vehicle seat removal, transport, and reinstallation apparatus, comprising:
   a chassis;
   a multiplicity of casters mounted to said chassis;
   a seat rear support pin coupled to said chassis for engaging a seat rear attachment of the vehicle seat;
   a locking forward pin attached to said chassis for engaging a forward seat attachment of the vehicle seat; and
   a locking pin receiver for receiving and supporting said forward locking pin when it is in an extended state.

2. The vehicle seat removal, transport, and reinstallation apparatus of claim 1, further comprising a load-bearing fulcrum mounted on said chassis.

3. The vehicle seat removal, transport, and reinstallation apparatus of claim 2, further comprising means for adjustably mounting the load-bearing fulcrum on said chassis.

4. The vehicle seat removal, transport, and reinstallation apparatus of claim 3, wherein said means for adjustably mounting the fulcrum on said chassis include a multiplicity of slots into which the load-bearing fulcrum may be inserted, the slots disposed longitudinally on the chassis to provide discrete positions for mounting the load-bearing fulcrum on said chassis.

5. The vehicle seat removal, transport, and reinstallation apparatus of claim 1, further comprising means for adjustably attaching said seat rear support pin.

6. The vehicle seat removal, transport, and reinstallation apparatus of claim 5, wherein said means for adjustably attaching said seat rear support pin includes a multiplicity of mounting holes into which the seat rear support pin may be inserted, the mounting holes disposed longitudinally on the chassis and providing discrete positions for mounting the seat rear support pin on said chassis.

7. The vehicle seat removal, transport, and reinstallation apparatus of claim 1, wherein said chassis includes a raised chassis, the raised chassis disposed above the multiplicity of casters for clearance over a seat base.

8. The vehicle seat removal, transport, and reinstallation apparatus of claim 1, wherein said chassis includes a lowered chassis, the lowered chassis disposed at a height above the vehicle floor to allow proximity to a seat track recessed into the vehicle floor.

9. The vehicle seat removal, transport, and reinstallation apparatus of claim 1, wherein three casters are mounted to said chassis.

10. The vehicle seat removal, transport, and reinstallation apparatus of claim 1, wherein four casters are mounted to said chassis.

11. The vehicle seat removal, transport, and reinstallation apparatus of claim 1, wherein said locking forward pin is attached to said chassis on a right side of said chassis.

12. The vehicle seat removal, transport, and reinstallation apparatus of claim 1, wherein said locking forward pin is attached to said chassis on a left side of said chassis.

13. The vehicle seat removal, transport, and reinstallation apparatus of claim 1, further comprising:
a second chassis; and
a connecting structure connecting the chassis and the second chassis.

14. The vehicle seat removal, transport, and reinstallation apparatus of claim 13, wherein the connecting structure comprises right and left outer structures which are adjustably coupled by forward and rear width adjustment slides for adjusting an overall width.

15. The vehicle seat removal, transport, and reinstallation apparatus of claim 13, wherein the connecting structure is removably attached.

16. A method of vehicle seat removal, comprising:
positioning one or more seat skates behind a seat such that each of the one or more seat skates is aligned with a respective vehicle seat attachment means of one or more vehicle seat attachment means, each of the one or more vehicle seat attachment means including a rear seat attachment and a forward seat attachment;
rotating the vehicle seat upward;
rolling the one or more seat skates forward such that the one or more seat skates straddle the respective vehicle seat attachment means;
rotating the one or more seat skates upward;
for each seat skate of the one or more seat skates, latching respective rear seat attachments of the vehicle seat to a seat rear support pin of the seat skate;
lowering the vehicle seat; and
for each seat skate of the one or more seat skates, disposing a forward locking pin into an extended position to couple the seat skate with the respective forward seat attachment, the extended end of the forward locking pin received and supported by a locking pin receiver.

* * * * *